United States Patent
Nishio et al.

(10) Patent No.: US 9,537,632 B2
(45) Date of Patent: *Jan. 3, 2017

(54) RECEIVING APPARATUS, RECEIVING METHOD AND INTEGRATED CIRCUIT

(71) Applicant: Godo Kaisha IP Bridge 1, Tokyo (JP)

(72) Inventors: Akihiko Nishio, Osaka (JP); Atsushi Matsumoto, Ishikawa (JP)

(73) Assignee: Godo Kaisha IP Bridge 1, Tokyo (JP)

( * ) Notice: Subject to any disclaimer, the term of this patent is extended or adjusted under 35 U.S.C. 154(b) by 189 days.

This patent is subject to a terminal disclaimer.

(21) Appl. No.: 14/460,019

(22) Filed: Aug. 14, 2014

(65) Prior Publication Data

US 2014/0355561 A1  Dec. 4, 2014

Related U.S. Application Data

(63) Continuation of application No. 10/567,551, filed as application No. PCT/JP2004/011556 on Aug. 11, 2004, now Pat. No. 8,843,142.

(30) Foreign Application Priority Data

Aug. 12, 2003 (JP) ................................. 2003-292667
May 31, 2004 (JP) ................................. 2004-162388

(51) Int. Cl.
*H04W 72/00* (2009.01)
*H04L 5/00* (2006.01)
(Continued)

(52) U.S. Cl.
CPC ........... *H04L 5/0051* (2013.01); *H04L 5/0007* (2013.01); *H04L 5/0048* (2013.01); *H04L 5/0094* (2013.01); *H04L 25/0226* (2013.01); *H04J 13/18* (2013.01)

(58) Field of Classification Search
CPC .... H04L 5/0048; H04L 5/0023; H04L 5/0007; H04L 5/0051; H04L 27/261; H04L 5/0039; H04L 5/0062; H04L 5/023; H04L 25/0226; H04L 1/0026; H04L 25/03866; H04L 27/2613; H04L 5/0053; H04L 5/0058
(Continued)

(56) References Cited

U.S. PATENT DOCUMENTS 5,960,028 A  9/1999  Okamoto et al.
6,347,220 B1  2/2002  Tanaka et al.
(Continued)

FOREIGN PATENT DOCUMENTS

CN  1235442 A  11/1999
EP  1 249 955 A1  10/2002
(Continued)

OTHER PUBLICATIONS

European Search Report dated Jun. 6, 2012, for corresponding EP Application No. 04771541.2-2415/1643669, 5 pages.
(Continued)

*Primary Examiner* — Fred Casca
(74) *Attorney, Agent, or Firm* — Seed IP Law Group LLP

(57) ABSTRACT

A radio communication apparatus is disclosed that enables the influence of the feedback information on the channel capacity to be kept to the minimum without reducing the transmission efficiency of information by transmission of pilot symbol. In the apparatus, a delay dispersion measuring section generates a delay profile using the received signal, and measures delay dispersion indicative of dispersion of delayed versions. A moving speed estimating section estimates moving speed of a mobile station apparatus that transmits a pilot symbol based on the variation in reception power of the pilot symbol. An other-cell interference mea-
(Continued)

suring section measures other-cell interference caused by signals transmitted in cells except the cell to which the apparatus belongs. Corresponding to the delay dispersion, moving speed and other-cell interference, a pilot pattern information generating section selects a pilot pattern such that placement of pilot symbol is optimal in a frame, and generates the pilot pattern information.

10 Claims, 17 Drawing Sheets

(51) Int. Cl.
H04L 25/02 (2006.01)
H04J 13/18 (2011.01)

(58) Field of Classification Search
USPC .......... 455/522, 127.1, 67.11, 69, 456.2, 68,455/277.1, 426.1, 561, 70; 370/335, 342, 280, 370/318, 330, 334, 319
See application file for complete search history.

(56) References Cited

U.S. PATENT DOCUMENTS

| | | | |
|---|---|---|---|
| 6,480,523 B1 | 11/2002 | Kondo | |
| 6,553,038 B1 | 4/2003 | Fukuda | |
| 6,827,483 B2 | 12/2004 | Kondo | |
| 7,027,464 B1 | 4/2006 | Nakahara et al. | |
| 7,313,174 B2 | 12/2007 | Alard et al. | |
| 2002/0094011 A1 | 7/2002 | Okumura et al. | |
| 2003/0022685 A1 | 1/2003 | Nilsson | |
| 2003/0060165 A1 | 3/2003 | Horisaki | |
| 2003/0073463 A1 | 4/2003 | Shapira | |
| 2003/0108013 A1 | 6/2003 | Hwang et al. | |
| 2003/0112852 A1 | 6/2003 | Kondo | |
| 2003/0124995 A1 | 7/2003 | Tanaka | |
| 2003/0133493 A1* | 7/2003 | Suzuki | H04B 1/7113 375/130 |
| 2003/0214927 A1 | 11/2003 | Atarashi et al. | |
| 2004/0125772 A9 | 7/2004 | Wu et al. | |
| 2004/0128605 A1 | 7/2004 | Sibecas et al. | |
| 2004/0131110 A1 | 7/2004 | Alard et al. | |
| 2005/0078315 A1 | 4/2005 | Ozeki et al. | |
| 2006/0172704 A1 | 8/2006 | Nishio et al. | |
| 2006/0182063 A1 | 8/2006 | Ma et al. | |

FOREIGN PATENT DOCUMENTS

| | | |
|---|---|---|
| FR | 2 820 574 A1 | 8/2002 |
| JP | 8-265184 A | 10/1996 |
| JP | 9-298491 A | 11/1997 |
| JP | 10-84313 A | 3/1998 |
| JP | 11-266228 A | 9/1999 |
| JP | 11-284597 A | 10/1999 |
| JP | 2000-151548 A | 5/2000 |
| JP | 2001-292124 A | 10/2001 |
| JP | 2001-339363 A | 12/2001 |
| JP | 2003-060609 A | 2/2003 |
| JP | 2003-110517 A | 4/2003 |
| JP | 2003-174426 A | 6/2003 |
| JP | 4879341 B2 | 2/2012 |
| WO | 02/065685 A1 | 8/2002 |

OTHER PUBLICATIONS

International Search Report dated Nov. 9, 2004, for corresponding International Application No. PCT/JP2004/011556.
Japanese Office Action dated Aug. 11, 2009.
Japanese Office Action dated Feb. 21, 2012, for corresponding JP Application No. 2011-226813, 2 pages.
Itami et al., "A Study of Equalization of OFDM Signal using Scattered Pilot Symbols," Journal of ITE 52(11), 1998, pp. 1650-1657.
Maehara et al., "Linear Predictive Maximal Ratio Combining Transmitter Diversity for OFDM-TDMA/TDD Systems," IEICE Transactions of Communication, E86-B(1), Jan. 2003, pp. 221-229.
Ribeiro et al., "On the impact of pilot density in the channel estimation of MC-CDMA systems," IEEE ISWCS, 2007.
Tufvesson et al., "Pilot Assisted Channel Estimation For OFDM in Mobile Cellular Systems," IEEE 47th Vehicular Technology Conference, 3(3), 1997, pp. 1639-1643.

* cited by examiner

RECEIVING APPARATUS, RECEIVING METHOD AND INTEGRATED CIRCUIT

BACKGROUND

Technical Field

The present invention relates to a radio communication apparatus and pilot symbol transmission method, and more particularly, to a radio communication apparatus and pilot symbol transmission method used in a radio communication system in which an individual pilot symbol is transmitted to each user.

Description of the Related Art

In a radio communication system, since the propagation environment varies every instant, it is necessary for a signal receiving side to compensate a received signal for the influence of the propagation environment. Therefore, the signal transmitted in the radio communication system generally contains a known pilot symbol. The signal receiving side detects the state of distortion of the pilot symbol by channel estimation, and, using the result, compensates data symbols including information for the influence of the propagation environment.

Specifically, for example, as shown in FIG. 1, the signal transmitting side places a pilot symbol (diagonally shaded areas in the figure) at the beginning of a frame, and data symbols (white areas in the figure) subsequent to the pilot symbol. Then, the receiving side performs channel estimation using the pilot symbols of two consecutive frames, performs interpolation, for example, and thereby compensates the data symbols over these two pilot symbols for the propagation path variation.

Data symbols are thus compensated for the propagation path variation based on channel estimation results of the pilot symbols arranged to sandwich the data symbols. Therefore, when the interval between pilot symbols is decreased, the accuracy (the propagation path compensation of the data symbol) improves. In other words, when the proportion of pilot symbols (in a frame) is increased, data symbols are received with higher accuracy.

However, since the pilot symbol does not include information to be transmitted, when the proportion of pilot symbols (in a frame) is increased, the proportion of data symbols is decreased and the information transmission efficiency is reduced.

In view of the foregoing, for example, Patent Document 1 discloses a technique for adaptively determining the subcarrier in which a pilot symbol is inserted according to reception power differences between subcarriers with different frequencies in OFDM (Orthogonal Frequency Division Multiplexing). In the technique disclosed in Patent Document 1, (the signal receiving side) determines a subcarrier to insert a pilot symbol, and transmits information on the subcarrier to a signal transmitting side as feedback. Then, according to this feedback information, the signal transmitting side inserts the pilot symbol to transmit.

Patent Document 1: JP 2003-174426

BRIEF SUMMARY

Problems to be Solved by the Invention

However, in the aforementioned technique, the signal receiving side needs to transmit information on the subcarrier to insert a pilot symbol as feedback every time, and there is a problem that the signal amount for feedback becomes enormous. As a result, the feedback information may constrict the channel capacity.

In particular, when the inserting position of a pilot symbol is determined adaptively, since it is preferable that a common pilot symbol is transmitted from a base station apparatus to mobile station apparatuses, determined mainly is the inserting position of a pilot symbol on the uplink channel from the mobile station apparatus to base station apparatus. Therefore, the feedback information is transmitted on the downlink channel from the base station apparatus to mobile station apparatuses. Accordingly, when the feedback information becomes enormous as in the above-mentioned technique, the channel capacity is constricted on the downlink channel to transmit data with relatively a large amount of data amount such as moving picture and music distribution, and the communication quality may deteriorate.

It is therefore an object of the present invention to provide a radio communication apparatus and pilot symbol transmission method capable of keeping the influence of the feedback information to the channel capacity to a minimum without reducing the transmission efficiency of information by transmitting of pilot symbols.

Means for Solving the Problem

A radio communication apparatus of the invention adopts a configuration having: an acquirer that acquires a parameter comprising an indicator of a propagation environment in which pilot symbols are transmitted; a pilot pattern selector that selects a pilot pattern indicating positions of the pilot symbols in a frequency domain and a time domain according to the parameter acquired; and a transmitter that transmits a signal including information of the pilot pattern selected. In other words, with the present invention, the pattern (hereinafter, referred to as a "pilot pattern") of arranging pilot symbols is determined based on parameters indicating the propagation environment, and the pilot symbols are transmitted according to pilot patterns.

Advantageous Effect of the Invention

According to the invention, the transmission efficiency of information is not reduced by transmission of pilot symbol, and the influence of the feedback information on the channel capacity can be kept to a minimum.

DETAILED DESCRIPTION

Embodiment 1

Embodiment 1 of the invention will specifically be described below with reference to the accompanying drawings. In the following descriptions, a base station apparatus and mobile station apparatus are assumed to perform communications in an OFDM (Orthogonal Frequency Division Multiplexing) system, and transmission of the pilot symbol on the uplink channel from the mobile station apparatus to base station apparatus will be described.

Figure 1:
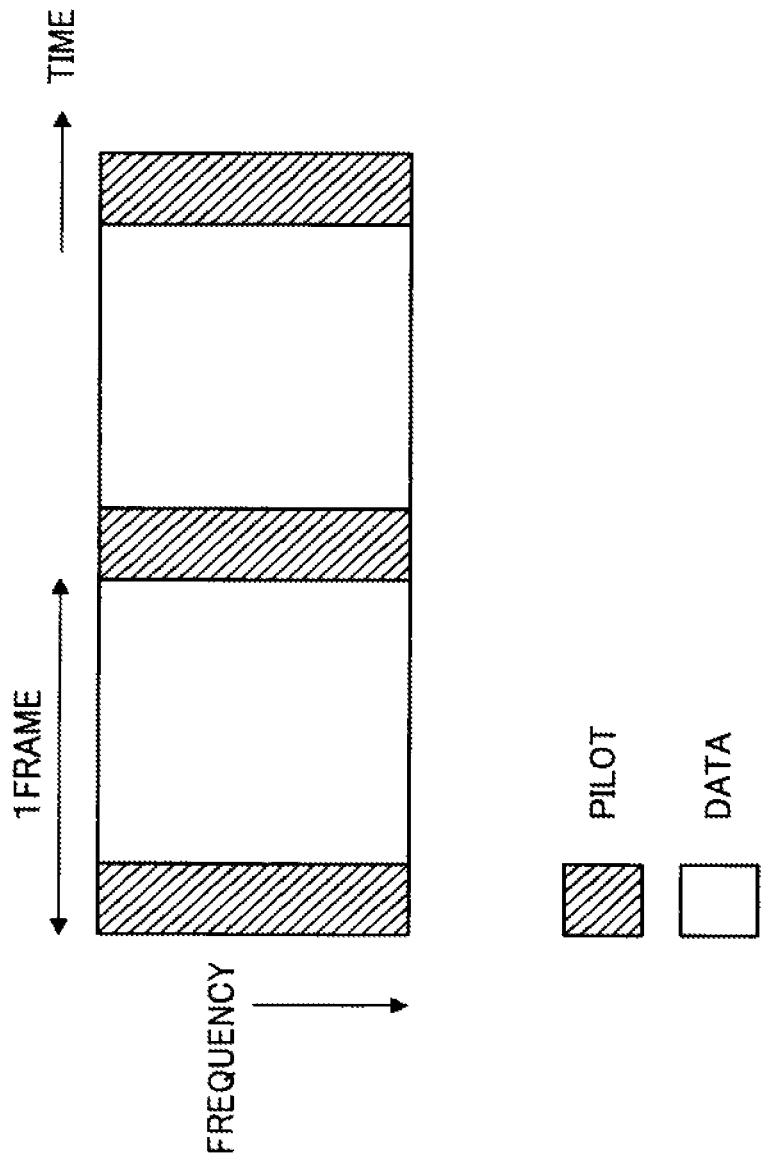
FIG. 1 is a diagram showing an example of a conventional frame format.
Figure 2:
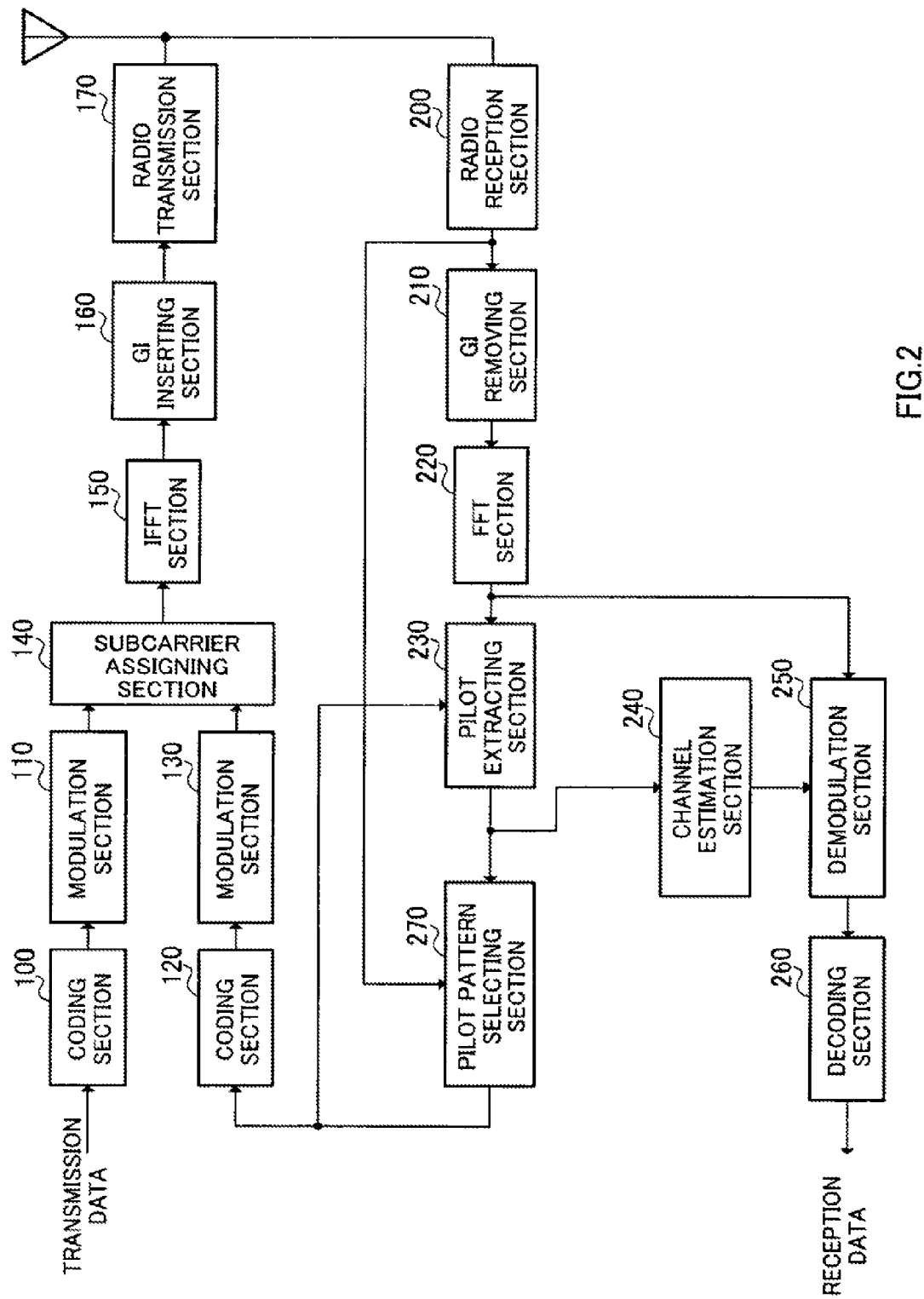
FIG. 2 is a block diagram illustrating a configuration of principal part of a base station apparatus according to Embodiment 1.

FIG. 2 is a block diagram illustrating a configuration of principal part of a base station apparatus according to Embodiment 1 of the invention. The base station apparatus shown in the figure has a transmission section comprised of coding section 100, modulation section 110, coding section 120, modulation section 130, subcarrier assigning section 140, IFFT (Inverse Fast Fourier Transform) section 150, GI (Guard Interval) inserting section 160 and radio transmission section 170, and a reception section comprised of radio reception section 200, GI removing section 210, FFT (Fast Fourier Transform) section 220, pilot extracting section 230, channel estimation section 240, demodulation section 250, decoding section 260 and pilot pattern selecting section 270.

Coding section 100 encodes transmission data, and outputs coded data to modulation section 110.

Modulation section 110 modulates the coded data output from coding section 100, and outputs modulated data to subcarrier assigning section 140.

Coding section 120 encodes pilot pattern information (described later) generated in pilot pattern selecting section 270, and outputs coded data to modulation section 130.

Modulation section 130 modulates the coded data output from coding section 120, and outputs modulated data to subcarrier assigning section 140.

Subcarrier assigning section 140 assigns a plurality of subcarriers having frequencies orthogonal to one another, to the transmission data and pilot pattern information. More specifically, for example, subcarrier assigning section 140 performs S/P (Serial/Parallel) transform on the transmission data to obtain parallel data of a plurality of sequences, and assigns subcarriers to data of each sequence and the pilot pattern information.

IFFT section 150 performs inverse fast Fourier transform on the transmission data and pilot pattern information and multiplex the results on the respectively assigned subcarriers, and thus generates an OFDM signal.

GI inserting section 160 copies an end portion of the OFDM signal to the beginning and inserts a guard interval.

Radio transmission section 170 performs predetermined radio transmission processing (such as D/A conversion and up-conversion) on the OFDM signal with the guard interval inserted therein to transmit via an antenna.

Radio reception section 200 receives the signal via an antenna, and performs predetermined radio reception processing (down-conversion and A/D conversion) on the received signal to output to GI removing section 210 and pilot pattern selecting section 270.

GI removing section 210 removes the guard interval from the received signal, and outputs the OFDM signal from which the guard interval is removed, to FFT section 220.

FFT section 220 performs fast Fourier transform on the OFDM signal, and demultiplexes the data multiplexed on each subcarrier to output to pilot extracting section 230 and demodulation section 250.

Pilot extracting section 230 extracts a pilot symbol which is a known symbol, from data output from FFT section 220 according to the pilot pattern selected in pilot pattern selecting section 270 to output to channel estimation section 240 and pilot pattern selecting section 270.

Channel estimation section 240 performs channel estimation using the known pilot symbol, and outputs a result of the channel estimation to demodulation section 250.

Demodulation section 250 demodulates the data multiplexed on each subcarrier using the result of the channel estimation, and outputs demodulated data to decoding section 260.

Decoding section 260 decodes the demodulated data, and outputs reception data.

Figure 3:
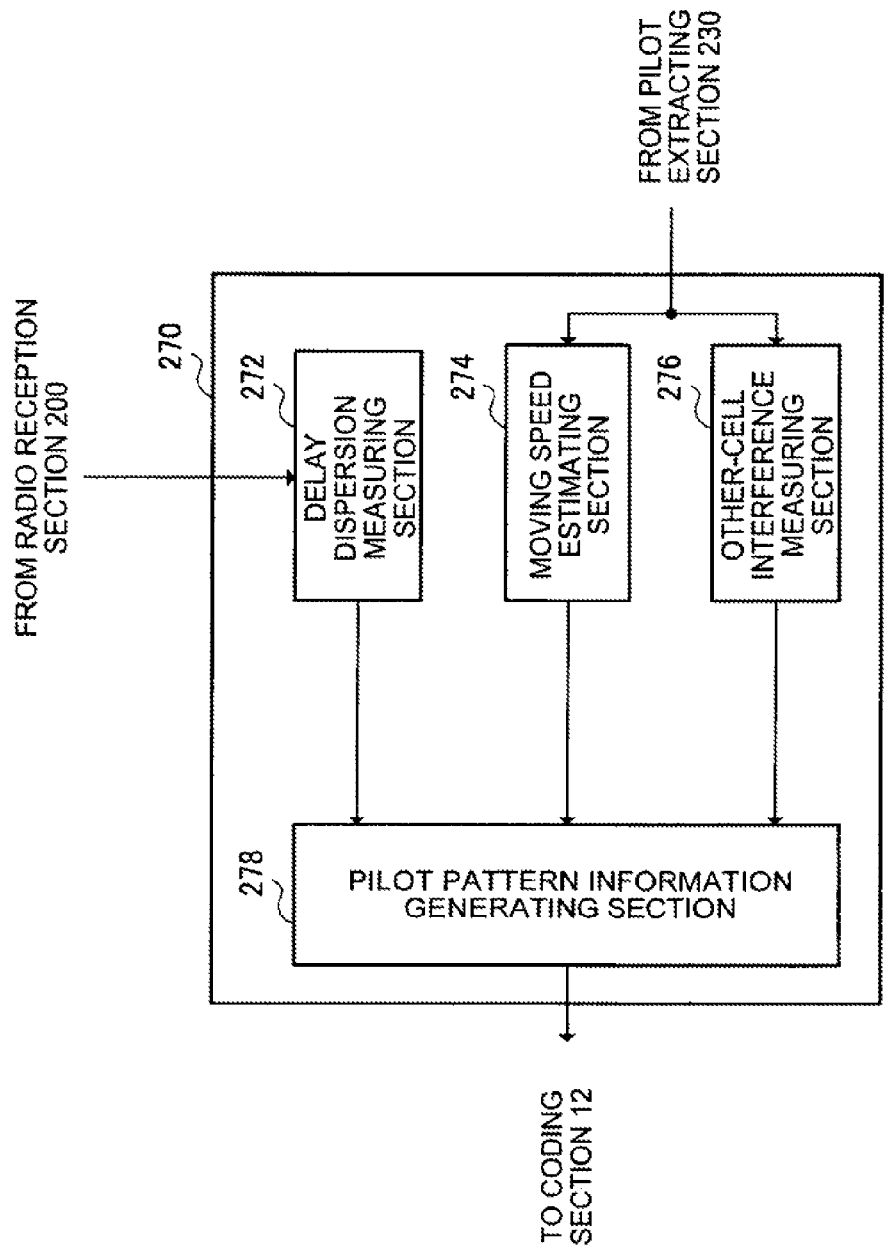
FIG. 3 is a block diagram illustrating an internal configuration of a pilot pattern selecting section according to Embodiment 1.

Pilot pattern selecting section 270 selects a pilot pattern such that the arrangement of pilot symbols is optimal in the frequency domain and time domain in a frame, corresponding to the propagation environment between the base station apparatus and a mobile station apparatus as a transmission source of the pilot symbol. More specifically, as shown in FIG. 3, pilot pattern selecting section 270 has delay dispersion measuring section 272, moving speed estimating section 274, other-cell interference measuring section 276 and pilot pattern information generating section 278.

Delay dispersion measuring section 272 generates a delay profile using the received signal, and measures delay dispersion indicative of dispersion of delayed waves. When the delay dispersion is large, i.e., the time is long between reception of a direct signal and reception of all delayed waves, the frequency selective fading is great. Meanwhile, when the delay dispersion is small, the frequency selective fading is also small. More specifically, for example, in the case of a propagation environment where delayed waves do not occur and only a direct signal is transmitted, the frequency selective fading does not exist.

In addition, in this Embodiment, it is described that a base station apparatus generates a delay profile, but since signals are transmitted via the same paths on the uplink and downlink channels in multipath propagation paths, a mobile station apparatus may generate a delay profile of the downlink channel to notify the base station, while measuring the delay dispersion.

Moving speed estimating section 274 estimates the moving speed of a mobile station apparatus that transmits a pilot symbol based on the variation in reception power of the pilot symbol. In other words, moving speed estimating section 274 estimates that the mobile station apparatus moves at high speed when the variation is fast in reception power of the pilot symbol, while estimating that the mobile station apparatus stops or moves at low speed when the reception power of the pilot symbol does not vary largely.

Using the pilot symbol, other-cell interference measuring section 276 measures interference (other-cell interference) by signals transmitted in other cells than the cell to which the base station apparatus belongs. Since the pilot symbol is known, other-cell interference measuring section 276 is capable of measuring interference (i.e., other-cell interference) provided from signals of other cells on the propagation path.

According to the delay dispersion, moving speed and other-cell interference, pilot pattern information generating section 278 selects the pilot pattern such that the arrangement of pilot symbol in a frame is optimal, and generates pilot pattern information indicative of the selected pilot pattern. Selection of the pilot pattern will specifically be described later.

Figure 4:
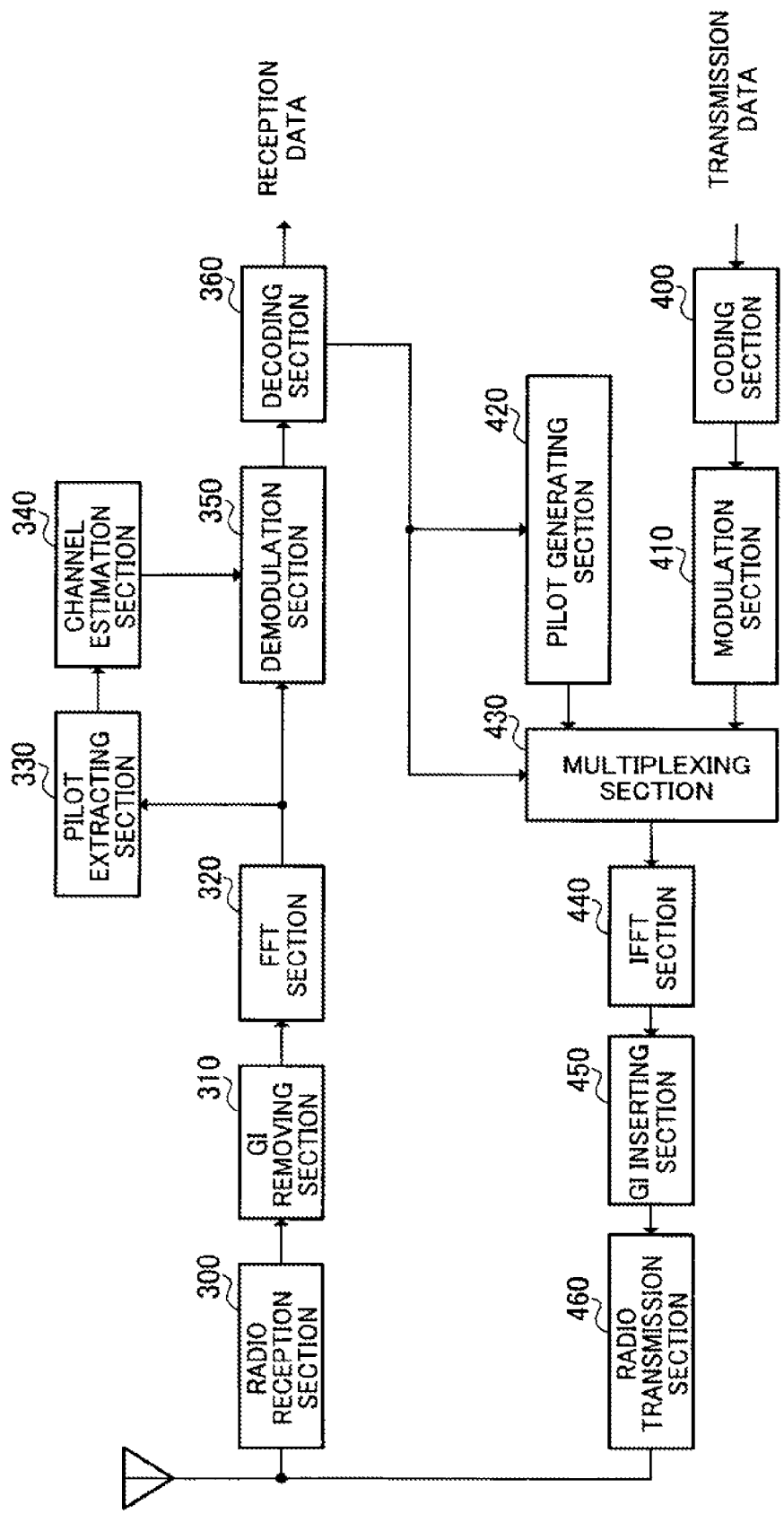
FIG. 4 is a block diagram illustrating a configuration of principal part of a mobile station apparatus according to Embodiment 1.

FIG. 4 is a block diagram illustrating a configuration of principal part of a mobile station apparatus according to Embodiment 1 of the invention. The mobile station apparatus as shown in the figure has a reception section comprised of radio reception section 300, GI removing section 310, FFT section 320, pilot extracting section 330, channel estimation section 340, demodulation section 350 and decoding section 360, and a transmission section comprised of coding section 400, modulation section 410, pilot generating section 420, multiplexing section 430, IFFT section 440, GI inserting section 450 and radio transmission section 460.

Radio reception section 300 receives the signal via an antenna, and performs predetermined radio reception processing (such as down-conversion and A/D conversion) on the received signal to output to GI removing section 310.

GI removing section 310 removes the guard interval from the received signal, and outputs the OFDM signal from which the guard interval is removed to FFT section 320.

FFT section 320 performs fast Fourier transform on the OFDM signal, and demultiplexes the data multiplexed on each subcarrier to output to pilot extracting section 330 and demodulation section 350.

Pilot extracting section 330 extracts a pilot symbol from the data output from FFT section 320 to output to channel estimation section 340.

Channel estimation section 340 performs channel estimation using the known pilot symbol, and outputs the channel estimation result to demodulation section 350.

Demodulation section 350 demodulates the data multiplexed on each subcarrier using the channel estimation result, and outputs demodulated data to decoding section 360.

Decoding section 360 decodes the demodulated data to output reception data, while outputting the pilot pattern information in the demodulated data to pilot generating section 420 and multiplexing section 430.

Coding section 400 encodes transmission data, and outputs coded data to modulation section 410.

Modulation section 410 modulates the coded data output from coding section 400, and outputs data symbols obtained to multiplexing section 430.

Pilot generating section 420 generates pilot symbols of an amount according to the pilot pattern information to output to multiplexing section 430.

According to the pilot pattern information, multiplexing section 430 places a pilot symbol in a frame, multiplexes the pilot symbol and data symbols, and transforms multiplexed data into parallel data to output to IFFT section 440.

IFFT section 440 performs inverse fast Fourier transform on the parallel multiplexed data to multiplex on the respectively assigned subcarriers, and thus generates an OFDM signal.

GI inserting section 450 copies an end portion of the OFDM signal to the beginning and inserts a guard interval.

Radio transmission section 460 performs predetermined radio transmission processing (such as D/A conversion and up-conversion) on the OFDM signal with the guard interval inserted therein to transmit via an antenna.

Described below is the operation of the base station apparatus and mobile station apparatus configured as described above using specific examples.

Herein, first described is the operation of the base station apparatus for a period during which radio reception section 200 in the base station apparatus receives a signal, a pilot pattern is selected and pilot pattern information is transmitted.

A signal received from the antenna of the base station apparatus is subjected to predetermined radio reception processing (such as down-conversion and A/D conversion), and output to GI removing section 210 and delay dispersion measuring section 272 in pilot pattern selecting section 270.

In the received signal, the guard interval is removed in GI removing section 210, the resultant signal is subjected to fast Fourier transform in FFT section 220, and data multiplexed on each subcarrier is thereby demultiplexed and output to pilot extracting section 230 and demodulation section 250.

Then, pilot extracting section 230 extracts a pilot symbol, and channel estimation section 240 performs channel estimation using the pilot symbol. The channel estimation result is output to demodulation section 250, and demodulation section 250 demodulates data using the channel estimation result. Then, demodulated data obtained by demodulation is decoded in decoding section 260, and reception data is thereby obtained.

Further, the pilot symbol extracted by pilot symbol extracting section 230 is output to moving speed estimating section 274 and other-cell interference measuring section 276 in pilot pattern selecting section 270.

Then, pilot pattern selecting section 270 selects an optimal pilot pattern as described below.

First, delay dispersion measuring section 272 generates a delay profile of the received signal to measure delay dispersion. As described above, the delay dispersion is an indicator of the level of frequency selective fading. This Embodiment adopts the configuration whereby the delay dispersion is measured by generating the delay profile, and another configuration may be used where by delay dispersion is in advance on a per cell basis. The delay dispersion is determined by, for example, the radius of the cell and the geographic features inside the cell, and is an almost constant value for each cell. Accordingly, such a configuration is available that stores the delay dispersion specific to the cell that is measured in advance and obtained without calculating the delay dispersion by generating the delay profile. In such a case, it is possible to reduce the amount of calculation to select a pilot pattern and increase the speed of processing.

Further, moving speed estimating section 274 estimates the moving speed of a mobile station apparatus. In other words, the moving speed of a mobile station apparatus is high when the variation in reception power of the pilot symbol is high, while the moving speed of a mobile station apparatus is low when the variation in reception power of the pilot symbol is low.

Furthermore, other-cell interference measuring section 276 measures other-cell interference provided from signals of other cells. By comparing the portion corresponding to the pilot symbol in the received signal with the original pilot symbol, it is possible to measure the other-cell interference provided from signals of other cells on the propagation path.

Based on parameters of delay dispersion, moving speed, and other-cell interference, obtained as described above, pilot pattern information generating section 278 selects a pilot pattern according to a policy as described below, and generates pilot pattern information indicative of the selected pilot pattern.

Figure 5A:
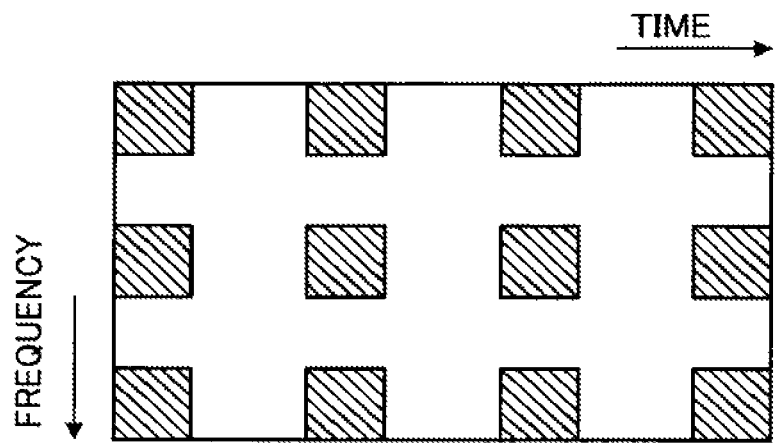
FIG. 5A is a view to explain a difference in the pilot pattern due to other-cell interference according to Embodiment 1.
Figure 5B:
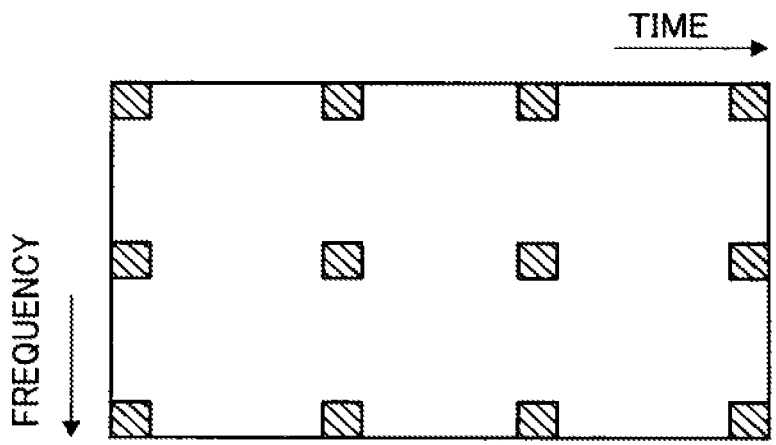
FIG. 5B is another view to explain a difference in the pilot pattern due to other-cell interference according to Embodiment 1.

When the other-cell interference measured in other-cell interference measuring section 276 is large, since the reception quality degrades, it is required to increase the proportion of pilot symbols in a frame as shown in FIG. 5A to increase the reception quality. Meanwhile, when the other-cell interference is small, the proportion of pilot symbols in a frame is decreased as shown in FIG. 5B. In addition, in FIGS. 5A and 5B, diagonally shaded areas represent pilot symbols, while white areas represent data symbols. Further, each of FIGS. 5A and 5B shows one frame, where the horizontal direction represents the level in the time domain, and the vertical direction represents the level in the frequency domain.

Figure 6A:
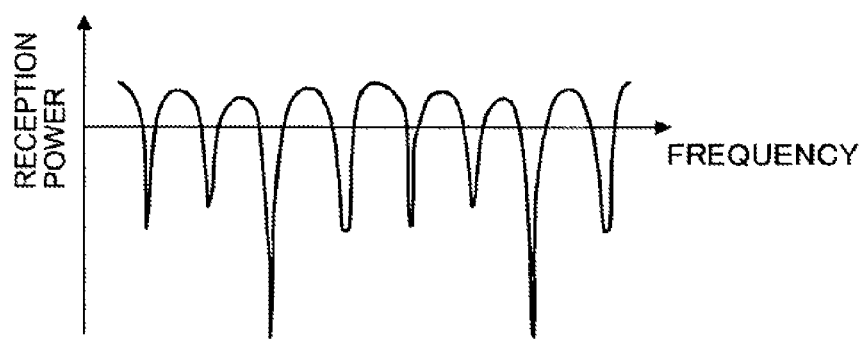
FIG. 6A is a chart showing an example of a reception power variation in the frequency domain according to Embodiment 1.
Figure 6B:
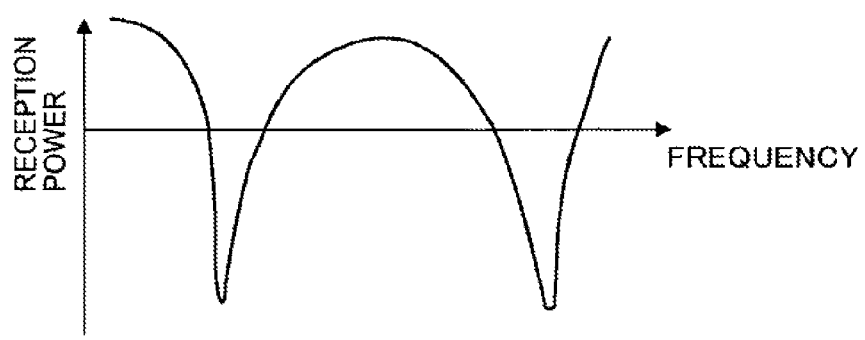
FIG. 6B is a chart showing another example of the reception power variation in the frequency domain according to Embodiment 1.

Further, when the delay dispersion measured in delay dispersion measuring section 272 is large, the frequency selectivity of fading is large as shown in FIG. 6A, different fading is imposed on close frequencies, and therefore, it is necessary to place pilot symbols densely in the frequency domain of a frame. Meanwhile, when the delay dispersion is small, the frequency selectivity of fading is small as shown in FIG. 6B, and it is not necessary to place pilot symbols densely in the frequency domain of a frame.

Figure 7A:
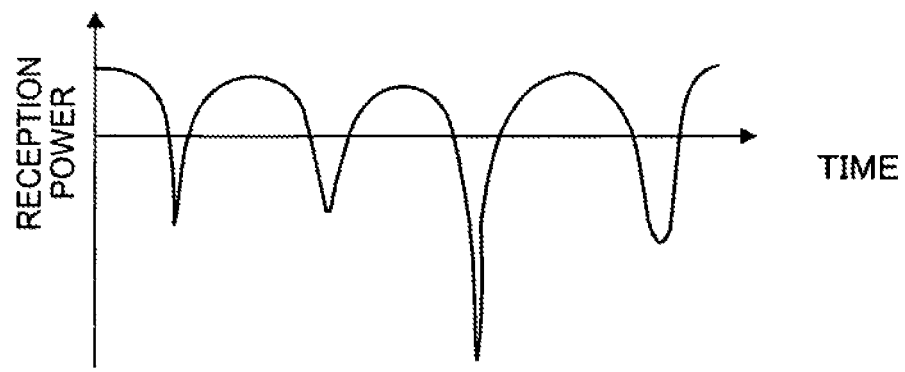
FIG. 7A is a chart showing an example of the reception power variation in the time domain according to Embodiment 1.
Figure 7B:
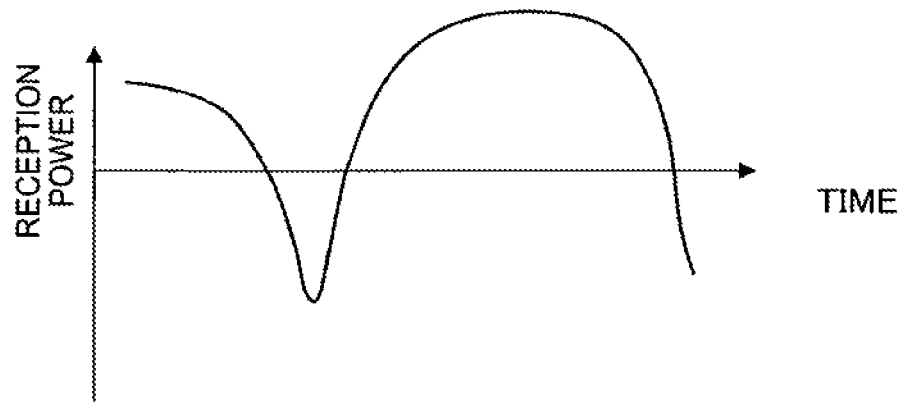
FIG. 7B is a chart showing another example of the reception power variation in the time domain according to Embodiment 1.

Then, when the moving speed of the mobile station apparatus is high which is estimated in moving speed estimating section 274, the temporal variation is intense in the propagation environment as shown in FIG. 7A, and it is thus necessary to place pilot symbols densely in the time domain of a frame. Meanwhile, when the moving speed of the mobile station apparatus is low, the temporal variation is moderate in the propagation environment as shown in FIG. 7B, and it is not necessary to place pilot symbols densely in the time domain of a frame.

In accordance with these policies, for example, according to the other-cell interference, pilot pattern information generating section 278 first determines unit levels in the frequency domain and time domain of pilot symbol. In other words, when the other-cell interference is large, for example, the unit level of pilot symbol is increased as shown in FIG. 5A (in the figure, each diagonally shaded rectangle represents one unit). Inversely, when the other-cell interference is small, the unit level of pilot symbol is decreased as shown in FIG. 5B, for example.

Figure 8:
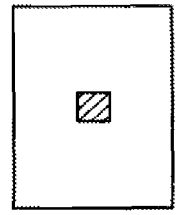
FIG. 8 is a view showing an example of pilot patterns corresponding to delay dispersion and moving speed according to Embodiment 1.

Then, when the unit level of pilot symbol is determined, the arrangement of units is determined from the table shown in FIG. 8, for example, and a pilot pattern is selected. In addition, each pilot pattern shown in FIG. 8 indicates the arrangement of pilot symbol in a frame, and the diagonally shaded area represents the pilot symbol. Further, in each pilot pattern, the horizontal direction represents the time domain, while the vertical direction represents the frequency domain.

In the example shown in FIG. 8, when the delay dispersion is less than a predetermined threshold Ta, only one unit of pilot symbol is arranged in the frequency domain (patterns 1, 2 and 3). Then, when the delay dispersion is equal to or greater than the predetermined threshold Ta and less than a predetermined threshold Tb, three units of pilot symbols are arranged in the frequency domain (patterns 4, 5 and 6). Further, when the delay dispersion is equal to or greater than the predetermined threshold Tb, pilot symbols are arranged continuously in the frequency domain (patterns 7 and 8).

Similarly, when the moving speed is less than a predetermined threshold Tc, only one unit of pilot symbol is arranged in the time domain (patterns 1, 4 and 7). Then, when the moving speed is the predetermined threshold Tc or more and less than a predetermined threshold Td, three units of pilot symbol are arranged in the time domain (patterns 2, 5 and 8). Further, when the moving speed is equal to or greater than the predetermined threshold Td, pilot symbols are arranged continuously in the time domain (patterns 3 and 6).

In addition, in FIG. 8, when the delay dispersion is equal to or greater than the predetermined threshold Tb and the moving speed is the predetermined threshold Td or more, the same pilot pattern (pattern 6 or 8) is selected as the pattern when one of the delay dispersion and moving speed is low. This is because the proportion of data symbols in a frame greatly decreases and the transmission efficiency of information degrades when pilot symbols are consecutive both in the frequency domain and time domain.

Actually, the fading variation over time is moderate as compared to the variation in frequency selective fading, and therefore, when the delay dispersion and moving speed are both high, the pilot pattern (pattern 8) is selected where the delay dispersion is equal to or greater than the predetermined threshold Tb and the moving speed is equal to or greater than the predetermined threshold Tc and less than the threshold Td.

To notify the mobile station apparatus of the pilot pattern selected thus, pilot pattern information generating section 278 generates the pilot pattern information. Herein, in the above-mentioned example, since two unit levels (FIGS. 5A and 5B) of pilot symbol exist that are determined according to the other-cell interference and eight patterns (FIG. 8) exist on each of the unit levels of pilot symbol, such pilot pattern information is generated that indicates which pilot pattern is selected from among sixteen (16=2×8) pilot patterns. Therefore, the pilot pattern information can be represented by maximum four bits ($2^4$=16), and it is possible to prevent the channel capacity from being inhibited by the feedback information to adaptively control transmission of the pilot symbol. In addition, the above-mentioned pilot patterns are only of one example, and it is possible to further reduce the information amount of the pilot pattern information depending on the number of pilot patterns.

The generated pilot pattern information is coded in coding section 120, modulated in modulation section 130, and output to subcarrier assigning section 140. Further, the pilot pattern information is output to pilot extracting section 230. Pilot extracting section 230 extracts pilot symbols that the mobile station apparatus transmits according to the pilot pattern information notified from the base station apparatus, according to the input pilot pattern information.

Meanwhile, transmission data is coded in coding section 100, modulated in modulation section 110, and output to subcarrier assigning section 140.

Then, subcarrier assigning section 140 assigns a subcarrier to each of the pilot pattern information and transmission data, IFFT section 150 performs inverse fast Fourier transform, and an OFDM signal is generated that includes the pilot pattern information and transmission data.

Subsequently, GI inserting section 160 copies an end portion of the OFDM signal to the beginning, thereby inserting a guard interval into the OFDM signal, radio transmission section 170 performs the predetermined radio transmission processing (such as D/A conversion and up-conversion) on the signal, and the radio signal is transmitted through the antenna.

Described below is the operation of the mobile station apparatus for a period during which radio reception section 300 in the mobile station apparatus receives the pilot pattern information and a signal including pilot symbols is transmitted.

Radio reception section 300 performs the predetermined radio reception processing (such as down-conversion and A/D conversion) on a signal received from the antenna of the mobile station apparatus. GI removing section 310 removes the guard interval from the signal. FFT section 320 performs fast Fourier transform on the signal, and demultiplexes the data multiplexed on each subcarrier to output to pilot extracting section 330 and demodulation section 350.

Then, pilot extracting section 330 extracts the pilot symbol. Channel estimation section 340 performs channel estimation using the pilot symbol, and outputs the channel estimation result to demodulation section 350. Demodulation section 350 demodulates the data using the channel estimation result. Decoding section 360 decodes the demodulated data obtained by demodulation, and obtains reception data and the pilot pattern information.

The obtained pilot pattern information is output to pilot generating section 420 and multiplexing section 430. Then, pilot generating section 420 generates a number of pilot symbols enabling the frame configuration of the pilot pattern indicated by the pilot pattern information, and outputs generated pilot symbols to multiplexing section 430.

Meanwhile, coding section 400 encodes transmission data, and modulation section 410 modulates the data and outputs as data symbols to multiplexing section 430.

According to the pilot pattern information, multiplexing section 430 multiplexes the pilot symbols and data symbols, and generates a frame of the pilot pattern indicated by the pilot pattern information.

IFFT section 440 performs inverse fast Fourier transform on the generated frame, and thus generates an OFDM signal including the pilot symbols and data symbols.

GI inserting section 450 copies an end portion of the OFDM signal to the beginning and inserts a guard interval into the OFDM signal. Radio transmission section 460 performs the predetermined radio transmission processing (such as D/A conversion and up-conversion) on the signal, and the radio signal is transmitted via the antenna.

Thereafter, the base station apparatus selects again a pilot pattern, and the aforementioned operation is repeated.

Thus, according to this Embodiment, a pilot pattern is selected to transmit pilot symbols that are optimal, necessary and sufficient for the propagation environment using as parameters delay dispersion, moving speed of the mobile station apparatus and interference caused by signals of other cells. The transmission efficiency of information is thereby not reduced by transmission of pilot symbols, and it is possible to keep the influence of feedback information on channel capacity to a minimum.

In addition, although a case has been described with this embodiment where pilot symbols are transmitted on the uplink channel, the invention is not limited to this. A mobile station apparatus selects a pilot pattern, and notifies the base station apparatus of the pilot pattern information, so that it is possible to control the transmission of pilot symbols on the downlink channel from the base station apparatus to the mobile station apparatus.

Further, although a case has been described with this embodiment where communications is performed in the OFDM system, the invention is not limited to this. The invention is applicable to multicarrier communications other than the OFDM system, and communications using a CDMA (Code Division Multiple Access) system, TDMA (Time Division Multiple Access) system or the like.

Moreover, depending on the applied communication system, the proportion of pilot symbols in a frame is determined using as parameters all interference amounts including interference by other mobile station apparatuses in the cell and interference by multipath, as well as the other-cell interference.

Further, although a case has been described with this embodiment where a configuration is provided that selects a pilot pattern using three parameters of delay dispersion, moving speed of a mobile station apparatus and interference by signals of other cells at the same time, the invention is not limited to this, and a pilot pattern may be selected using only one or two of these parameters.

Furthermore, the parameters are not limited to above three parameters, and corresponding to any parameters that reflect the propagation environment, it is possible to determine an arrangement of pilot symbols in the frequency domain and time domain of a frame.

Embodiment 2

The influence of the accuracy of channel estimation using the pilot symbol on the bit error rate varies between modulation schemes. In other words, as the modulation scheme has a larger modulation level, higher accuracy is required in channel estimation. Particularly, in QAM modulation such as 16QAM and 64QAM, since judgment on amplitude is required as well as judgment on phase upon demodulation, high accuracy is required in channel estimation. Further, to achieve high accuracy in channel estimation, it is necessary to increase a proportion of pilot symbols (i.e., density of pilot symbols) in a frame.

Therefore, in this Embodiment, a pilot pattern is selected further considering the modulation scheme in addition to three parameters (delay dispersion, moving speed of a mobile station apparatus and other-cell interference) used in Embodiment 1. In addition, in following descriptions, as in Embodiment 1, a base station apparatus and mobile station apparatus are assumed to perform communications in the OFDM system, and described is transmission of the pilot symbol on the uplink channel from the mobile station apparatus to base station apparatus.

Figure 9:
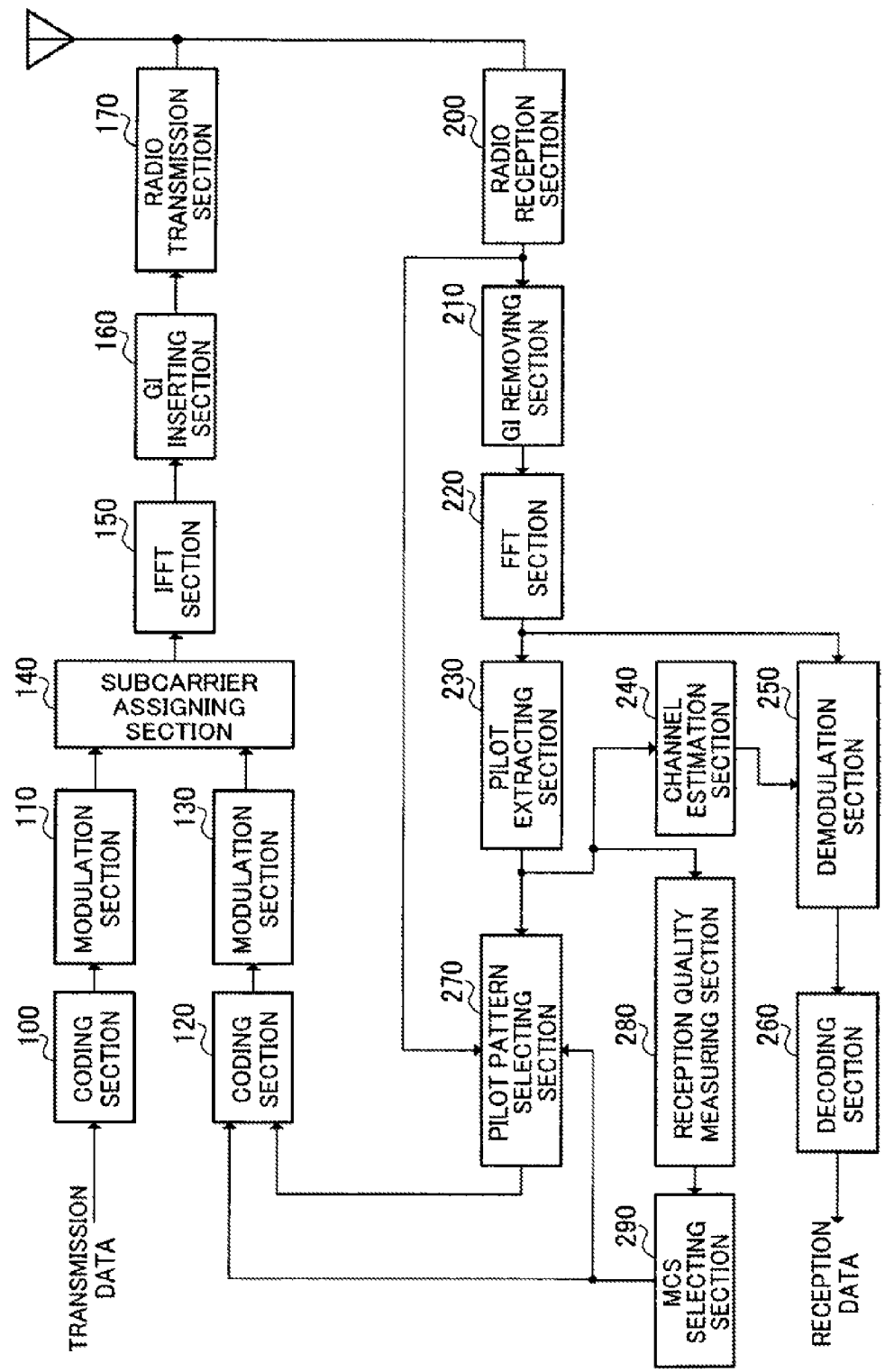
FIG. 9 is a block diagram illustrating a configuration of principal part of a base station apparatus according to Embodiment 2.

FIG. 9 is a block diagram illustrating a configuration of principal part of a base station apparatus according to Embodiment 2 of the invention. In addition to the configuration of Embodiment 1 (FIG. 2), the base station apparatus according to this Embodiment has reception quality measuring section 280 and MCS (Modulation and Coding Scheme) selecting section 290.

Reception quality measuring section 280 measures the SIR as reception quality using pilot symbols input from pilot extracting section 230, and outputs a measurement value to MCS selecting section 290.

Based on the SIR value input from reception quality measuring section 280, MCS selecting section 290 selects a modulation scheme and coding rate of data for the mobile station apparatus to transmit, and outputs information (MCS information) indicative of the selected modulation scheme and coding rate to pilot pattern selecting section 270 and coding section 120. MCS selecting section 290 has a table (MCS table) set for a plurality of combinations of modulation scheme and coding rate enabling reception of data with a predetermined error rate respectively in relation to a plurality of SIR values, and by referring to the MCS table based on the SIR value, selects the optimal combination of modulation scheme and coding rate from among the plurality of combinations. The MCS information is subjected to the same processing as in the pilot pattern information and transmitted to the mobile station apparatus.

Pilot pattern selecting section 270 selects a pilot pattern further considering the modulation scheme selected in MCS selecting section 290 in addition to the three parameters (delay dispersion, moving speed of a mobile station apparatus and other-cell interference) described in Embodiment 1. The selection method will be described later.

Figure 10:
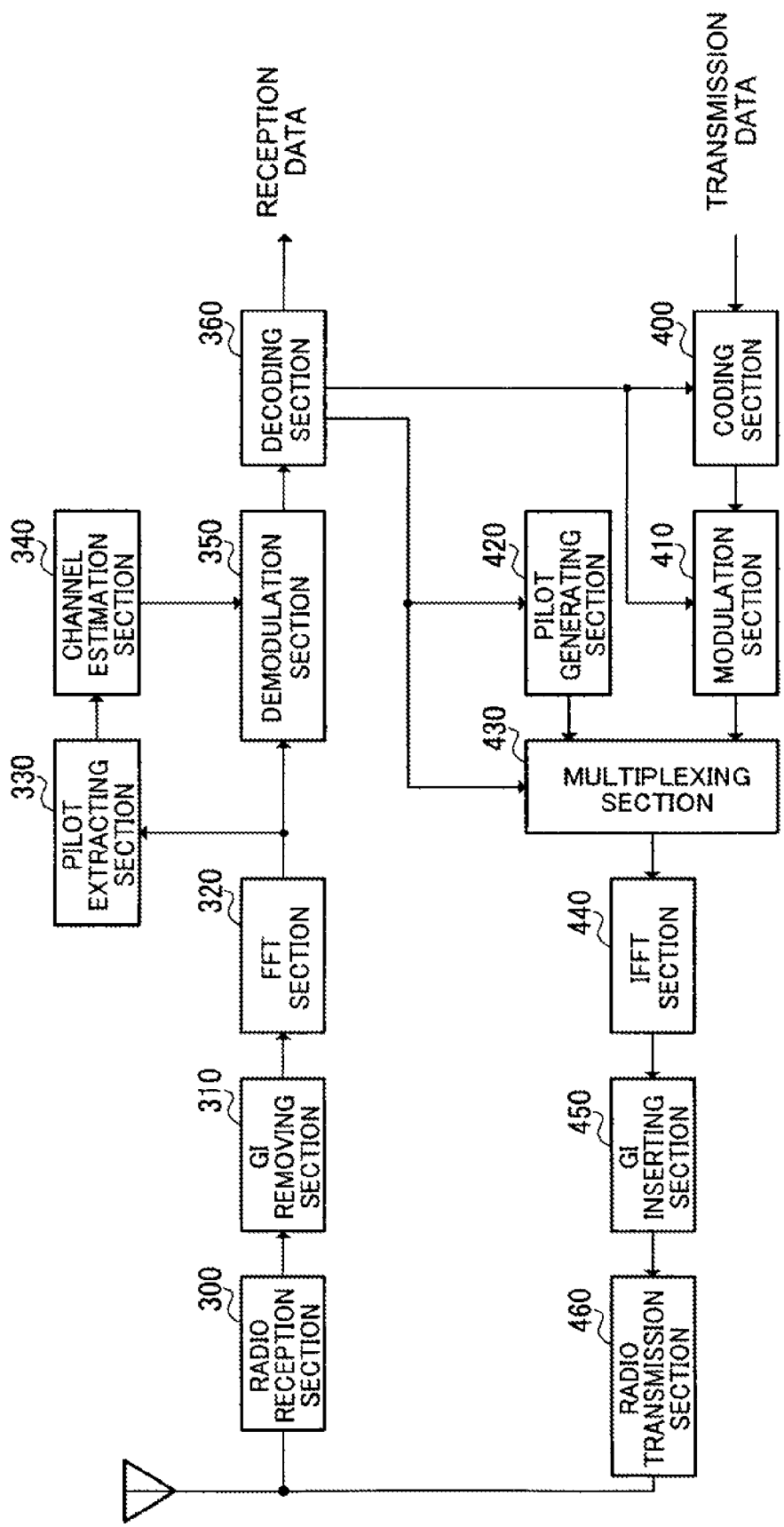
FIG. 10 is a block diagram illustrating a configuration of principal part of a mobile station apparatus according to Embodiment 2.

FIG. 10 is a block diagram illustrating a configuration of principal part of a mobile station apparatus according to Embodiment 2 of the invention. The configuration of the mobile station apparatus according to this Embodiment is the same as in Embodiment 1 (FIG. 4) except that the MCS information decoded in decoding section 360 is output to coding section 400 and modulation section 410, and that the coding rate in coding section 400 and the modulation rate in modulation section 410 are controlled according to the MCS information. In other words, the mobile station apparatus encodes data to transmit to the base station with the coding rate indicated by the MCS information and modulates the data with the modulation scheme indicated by the MCS information.

Described next is selection of pilot pattern in this Embodiment. There are two methods of selecting a pilot pattern in consideration of the modulation scheme. These are: a method (hereinafter, referred to as selection method 1) of selecting a pilot pattern according to FIG. 8 using values obtained by adding an offset determined based on the modulation scheme to a measurement value of delay dispersion and an estimation value of moving speed, and another method (hereinafter, referred to as selection method 2) of inserting a number of pilot symbols determined based on the modulation scheme between units of pilot symbol in the pilot pattern determined according to FIG. 8.

<Selection Method 1>

Figure 11:
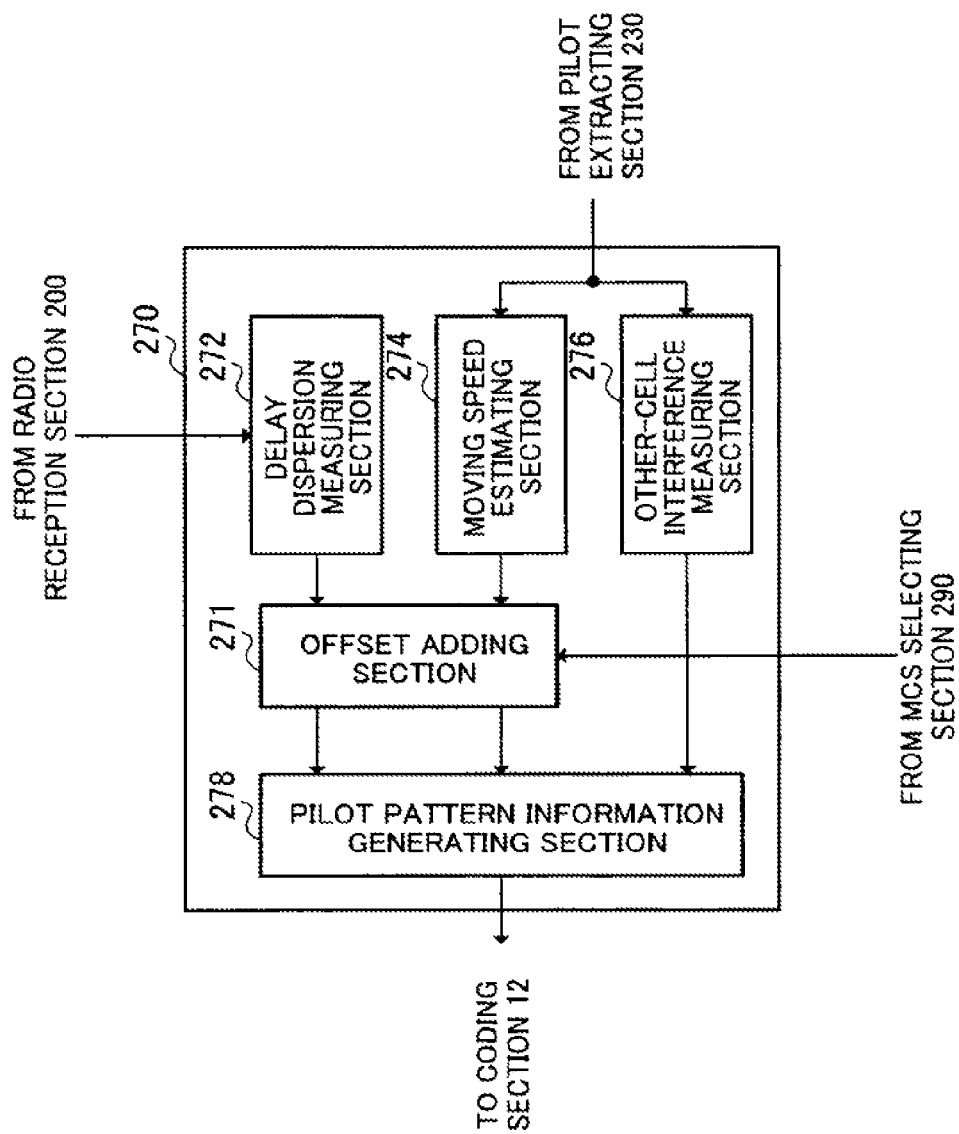
FIG. 11 is a block diagram illustrating an internal configuration of a pilot pattern selecting section according to Embodiment 2.

In the case of selection method 1, the configuration of pilot pattern selecting section 270 is as shown in FIG. 11. Pilot pattern selecting section 270 as shown in FIG. 11 is configured with the configuration in Embodiment 1 (FIG. 3) and further with offset adding section 271.

Offset adding section 271 receives the MCS information from MCS selecting section 290. Offset adding section 271 adds an offset according to the modulation scheme indicated by the MCS information to the delay dispersion input from delay dispersion measuring section 272 and to the moving speed input from moving speed estimating section 274. The offset has a larger value as the modulation level is larger. In other words, the offset for 64QAM is larger than the offset for 16QAM, and the offset for 16QAM is larger than the offset for QPSK. In addition, the offset for QPSK can be set at zero. Further, it is possible to use different values for the offset to add to the moving speed and the offset to add to the delay dispersion. The delay dispersion and moving speed with the offset added thereto are output to pilot pattern information generating section 278.

Based on the delay dispersion and moving speed with the offset added thereto, pilot pattern information generating section 278 makes a determination with thresholds as described in Embodiment 1 (FIG. 8) and selects a pilot pattern. Since the offset is larger as the modulation level is larger, when the pilot pattern is thus selected, the proportion of pilot symbols in a frame, i.e., density of pilot symbols increases as the modulation level is larger.

<Selection Method 2>

Figure 12:
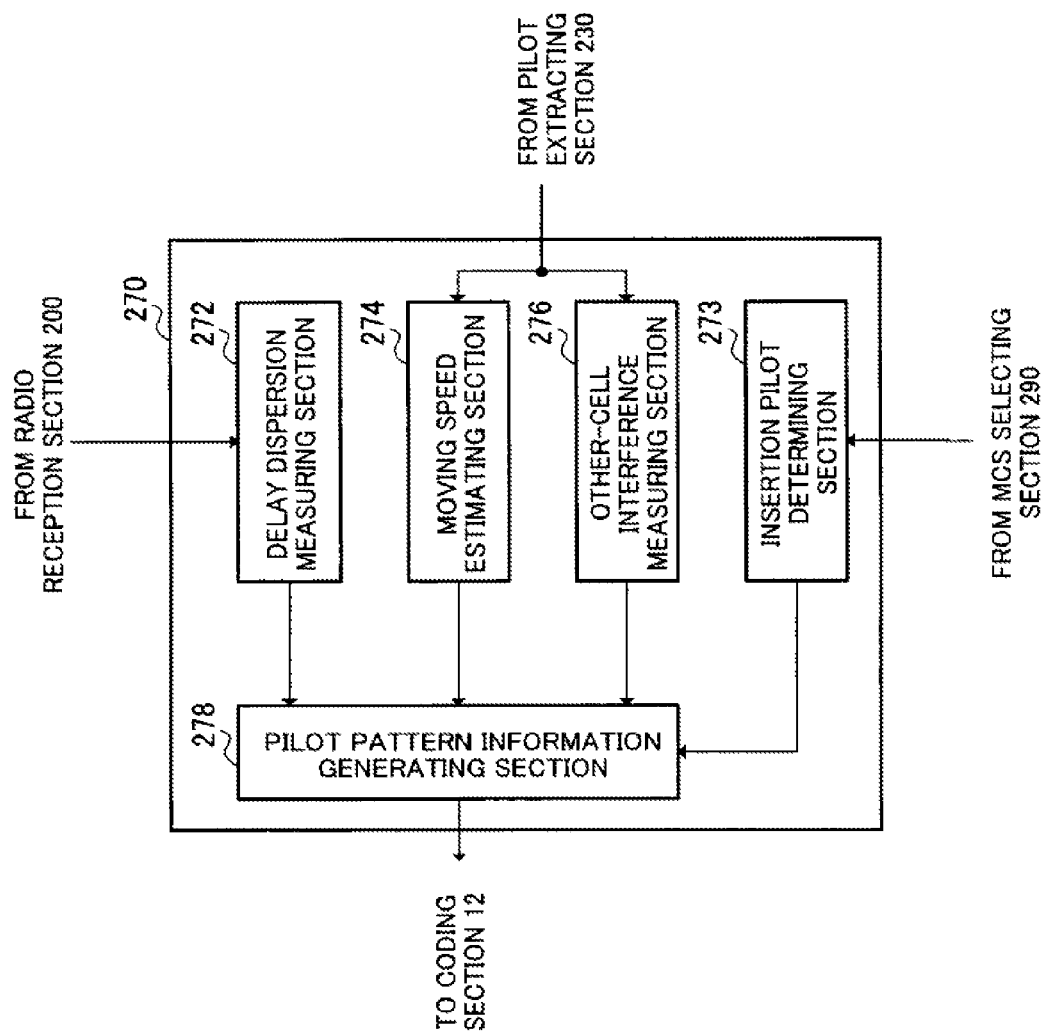
FIG. 12 is a block diagram illustrating an internal configuration of a pilot pattern selecting section according to Embodiment 2.

In the case of selection method 2, the configuration of pilot pattern selecting section 270 is as shown in FIG. 12. Pilot pattern selecting section 270 as shown in FIG. 12 is configured with the configuration in Embodiment 1 (FIG. 3) and further with insertion pilot determining section 273.

Insertion pilot determining section 273 receives the MCS information from MCS selecting section 290. Based on the modulation scheme indicated by the MCS information, insertion pilot determining section 273 determines the number of pilot symbols to insert between units of pilot symbol. The number increases as the modulation level is larger. In other words, the number for 64QAM is larger than the number for 16QAM, and the number for 16QAM is larger than the number for QPSK. The determined number is output to pilot pattern information generating section 278.

Figure 13:
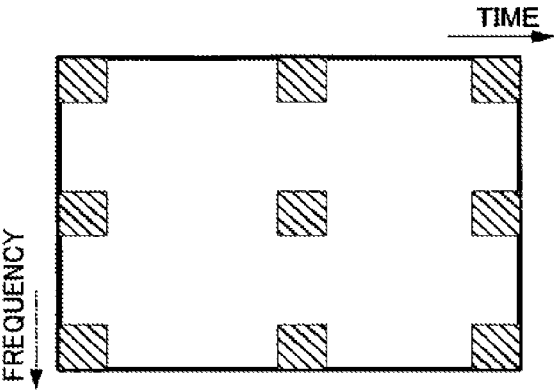
FIG. 13 is a view showing an example of pilot patterns corresponding to modulation schemes according to Embodiment 2.

Pilot pattern information generating section 278 selects a pilot pattern obtained by further inserting a number of pilot symbols determined in insertion pilot determining section 273 to the pilot pattern selected as a result of the determination with thresholds as described in Embodiment 1 (FIG. 8). For example, when the moving speed is Tc or more and less than Td and the delay dispersion is Ta or more and less than Tb, pattern 5 in FIG. 8 is first selected. Then, for example, in the case that insertion numbers are determined beforehand such that the number for QPSK is zero, the number for 16QAM is one and the number for 64QAM is two, pilot patterns selected for the modulation schemes are as shown in FIG. 13. In other words, in the case where the modulation scheme is QPSK, since the insertion number is zero, pattern 5 in FIG. 8 is selected without change. Further, in the case where the modulation scheme is 16QAM, since the insertion number is one, such a pattern is selected that one pilot symbol is further inserted between units of pilot symbol in pattern 5 in FIG. 8. Furthermore, in the case where the modulation scheme is 64QAM, since the insertion number is two, such a pattern is selected that two pilot symbols are further inserted between units of pilot symbol in pattern 5 in FIG. 8. Since the number of pilot symbols to insert is increased as the modulation level is larger, when the pilot pattern is thus selected, the proportion of pilot symbols in a frame (i.e., density of pilot symbols) increases as the modulation level is larger.

In QAM modulation such as 16QAM and 64QAM, as described above, since judgment on amplitude is made as well as judgment on phase upon demodulation, the error rate is greatly improved by responding to at least the amplitude variation. In other words, QAM modulation only needs minimum pilot symbols required to respond to the amplitude variation. Therefore, in selection method 2, as shown in FIG. 13, a unit of pilot symbol to insert in the case where the modulation scheme is 16QAM and 64QAM may be made smaller than a unit of pilot symbol in the pilot pattern (FIG. 8) selected based on the moving speed and delay dispersion. It is thus possible to prevent the data transmission efficiency from deteriorating due to an increase in the proportion of pilot symbols in a frame.

In addition, both in selection method 1 and selection method 2, as in Embodiment 1, it is possible to control the proportion of pilot symbols in a frame further using the other-cell interference.

Thus, according to this Embodiment, since the proportion of pilot symbols in a frame is varied according to the modulation scheme, it is possible to select a pilot pattern to transmit optimal, necessary and sufficient pilot symbols according to the modulation scheme.

Embodiment 3

Embodiments 1 and 2 describe transmission of pilot symbol on the uplink channel from the mobile station apparatus to the base station apparatus. This Embodiment describes transmission of pilot symbol on the downlink channel from the base station apparatus to the mobile station apparatus. Further, in this Embodiment, the base station apparatus and mobile station apparatus are assumed to perform communications in the OFDM system as in Embodiments 1 and 2, and further, perform communications for each time slot as a transmission unit basis.

Figure 14:
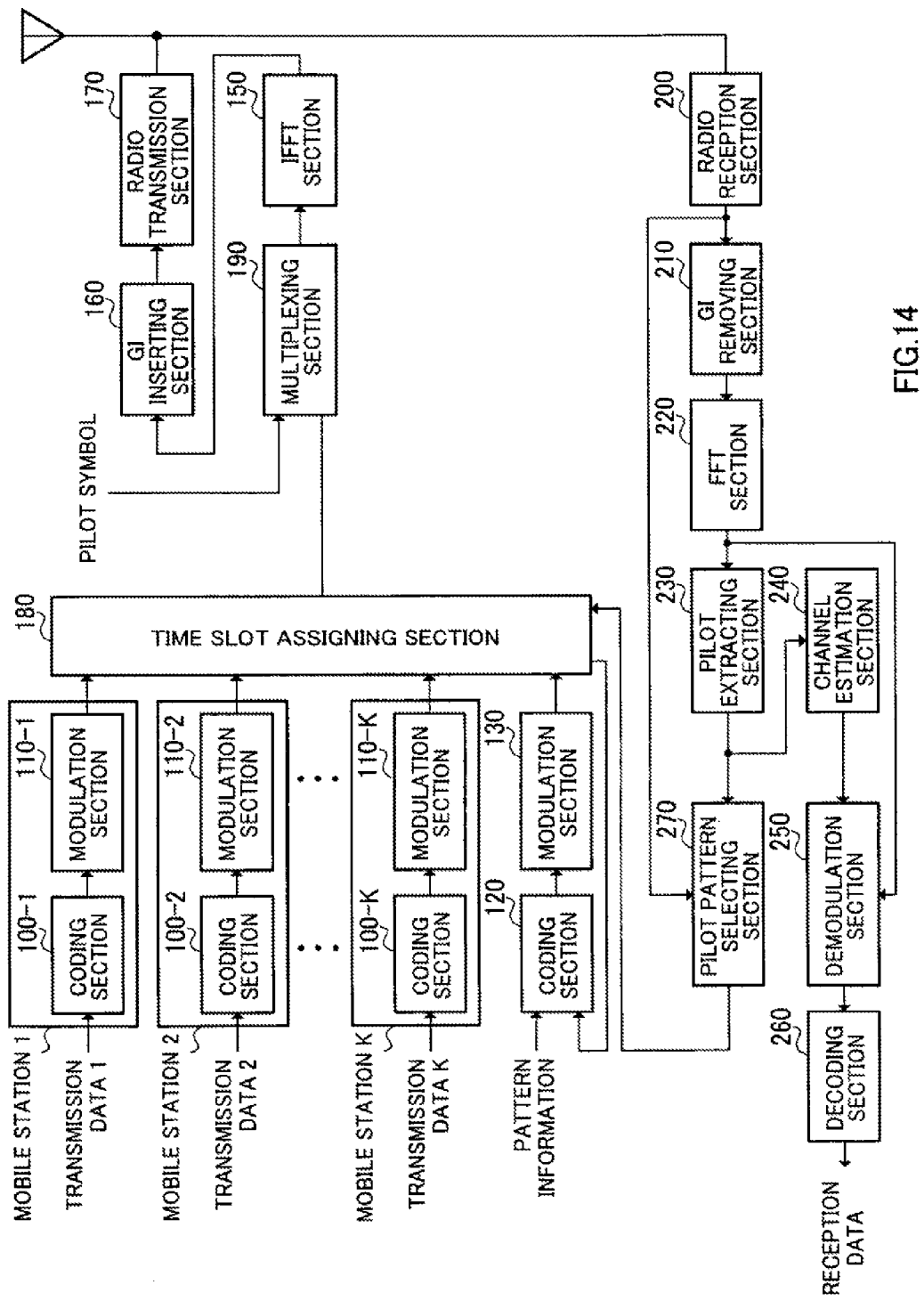
FIG. 14 is a block diagram illustrating a configuration of principal part of a base station apparatus according to Embodiment 3.

FIG. 14 is a block diagram illustrating a configuration of principal part of a base station apparatus according to Embodiment 3. In FIG. 14, the same structural elements as in Embodiment 1 (FIG. 2) are assigned the same reference numerals to omit descriptions thereof.

Coding sections 100-1 to 100-K and modulation sections 110-1 to 110-K perform coding and modulation on transmission data 1 to K to mobile station apparatuses 1 to K, respectively. The modulated transmission data 1 to K is output to time slot assigning section 180.

Pattern information input to coding section 120 is information to notify the mobile station apparatus of which pilot pattern is set for each time slot constituting one frame. The pattern information is encoded in coding section 120, modulated in modulation section 130, and output to time slot assigning section 180.

Figure 15:
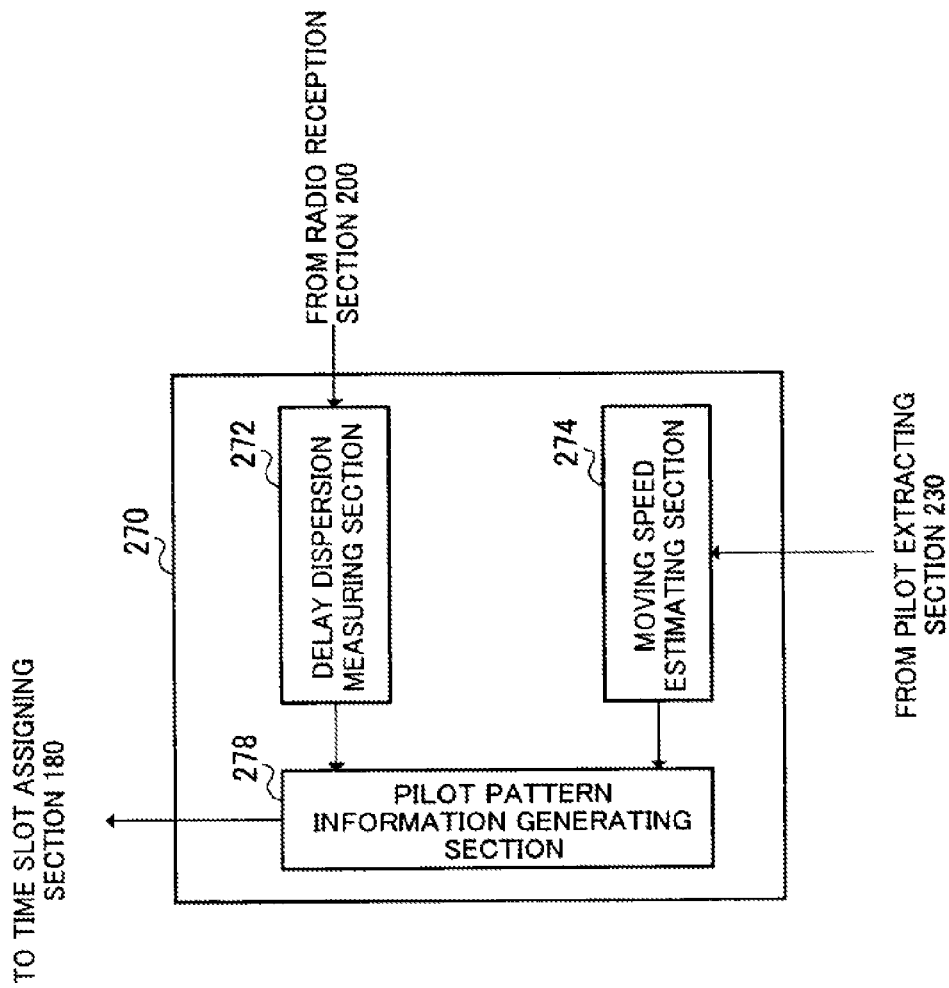
FIG. 15 is a block diagram illustrating an internal configuration of a pilot pattern selecting section according to Embodiment 3.

As shown in FIG. 15, pilot pattern selecting section 270 is comprised of delay dispersion measuring section 272, moving speed estimating section 274, and pilot pattern information generating section 278, and based on the delay dispersion and moving speed of each mobile station apparatus, selects a pilot pattern of pilot symbol to transmit on the downlink channel for each mobile station apparatus. The selection method will be described later. The pilot pattern information generated in pilot pattern information generating section 278 is output to time slot assigning section 180.

Time slot assigning section 180 determines which time slot in a frame is assigned transmission data for which mobile station apparatus, according to the pilot pattern for each mobile station apparatus selected in pilot pattern selecting section 270. The assignment method will be described later. Then, time slot assigning section 180 inputs assignment information indicative of which time slot is assigned transmission data to which mobile station apparatus to coding section 120. The assignment information is encoded in coding section 120, modulated in modulation section 130, and input to time slot assigning section 180. Time slot assigning section 180 assigns transmission data 1 to K respectively to mobile station apparatuses 1 to K, pattern information and assignment information to each time slot in a frame, and outputs each time slot assigned such data and information to multiplexing section 190 successively.

Multiplexing section 190 multiplexes transmission data 1 to K, pattern information, assignment information and pilot symbols according to the pilot pattern on a per time slot basis. Each multiplexed time slot is subjected to inverse fast Fourier transform in IFFT section 150.

Figure 16:
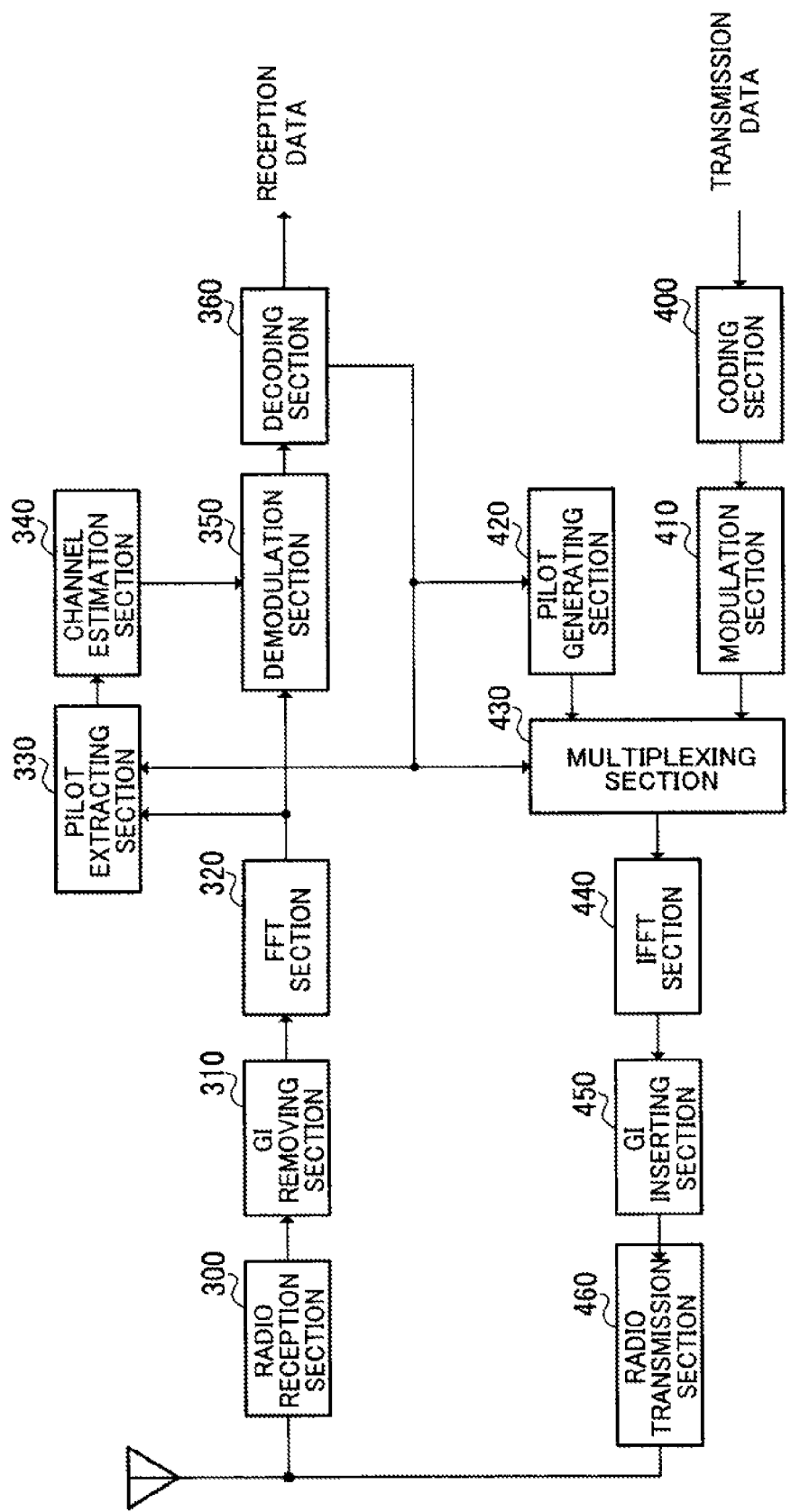
FIG. 16 is a block diagram illustrating a configuration of principal part of a mobile station apparatus according to Embodiment 3.

FIG. 16 is a block diagram illustrating a configuration of principal part of a mobile station apparatus according to Embodiment 3 of the invention. The configuration of the mobile station apparatus according to this Embodiment is the same as in Embodiment 1 (FIG. 4) except that the pilot pattern information decoded in decoding section 360 is input to pilot extracting section 330, and that according to the input pilot pattern information, pilot extracting section 330 extracts pilot symbols from data output from FFT section 320.

Described next is selection of pilot pattern and assignment of time slot in this Embodiment. In addition, it is assumed in the following descriptions that one frame is comprised of eight time slots (TS1 to TS8), and that assignment to each time slot is performed for each frame. In addition, the number of time slots constituting one frame is not limited to eight.

Figure 17:
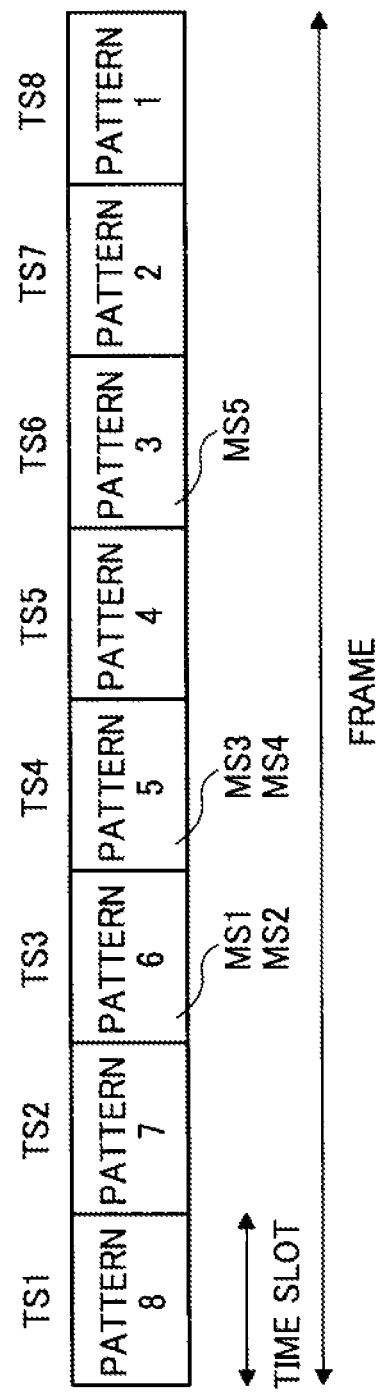
FIG. 17 is a view showing an example of the correspondence relationship between a pilot pattern and time slot according to Embodiment 3.

As shown in FIG. 17, each time slot (TS1 to TS8) constituting one frame is set for a pilot pattern as shown in FIG. 8. In addition, here, the pilot pattern shown in FIG. 8 represents the arrangement of pilot symbols in each time slot. The pattern information is information to indicate which pilot pattern among pilot patterns 1 to 8 is set on each time slot of TS1 to TS8. In addition, the pilot pattern for each time slot may be set beforehand and fixed, or varied for each frame according to the number of mobile station apparatuses for which the pilot pattern is selected, the channel quality and the like. Further, the same pilot pattern may be set on a plurality of time slots.

In pilot pattern selecting section 270, for each mobile station apparatus, delay dispersion measuring section 272 measures the delay dispersion, and moving speed estimating section 274 estimates the moving speed. In this Embodiment, since data transmission from each mobile station apparatus on the uplink channel is also performed in time division on a per time slot basis, pilot pattern selecting section 270 is capable of measuring the delay dispersion and moving speed for each mobile station apparatus. Based on the delay dispersion and moving speed, pilot pattern information generating section 278 makes a determination with thresholds described in Embodiment 1 (FIG. 8), and selects a pilot pattern for each mobile station apparatus. At this point, pilot pattern information generating section 278 selects a pilot pattern for each mobile station apparatus from pilot patterns other than pattern 8. As described above, pattern 8 has the best response to the variation in propagation environment among patterns 1 to 8, and therefore is set on TS1 that is a time slot in the beginning of a frame, while being fixed to be used as a pilot pattern of the pattern information and assignment information. In addition, when the delay dispersion is the predetermined threshold Tb or more and the moving speed is equal to or greater than the predetermined threshold Tc in FIG. 8, pilot pattern information generating section 278 is assumed to select pattern 6 instead of pattern 8. It is assumed in the following descriptions that five mobile station apparatuses 1 to 5 (MS1 to 5) exist, pattern 6 is selected for mobile station apparatuses 1 and 2 (MS1 and MS2), pattern 5 is selected for mobile station apparatuses 3 and 4 (MS3 and MS4), and that pattern 3 is selected for mobile station apparatus 5 (MS5). It is thus possible to select one pilot pattern for a plurality of mobile station apparatuses at the same time, so that the plurality of mobile station apparatuses are able to share one pilot pattern. Then, the pilot pattern information indicative of the selection result is input to time slot assigning section 180.

According to the pilot pattern selected for each mobile station apparatus in pilot pattern selecting section 270, time slot assigning section 180 assigns transmission data for each mobile station apparatus to each time slot. In other words, transmission data 1 for mobile station apparatus 1 for which pattern 6 is selected is assigned to TS3 on which pattern 6 is set. At the same time, transmission data 2 for mobile station apparatus 2 for which pattern 6 is selected is assigned to TS3, transmission data 3 and 4 for mobile station apparatuses 3 and 4 for which pattern 5 is selected is assigned to TS4 on which pattern 5 is set, and transmission data 5 for mobile station apparatus 5 for which pattern 3 is selected is assigned to TS6 on which pattern 3 is set. Thus, as a result of selecting one pilot pattern for a plurality of mobile station apparatuses at the same time, transmission data to a plurality of mobile station apparatuses is assigned to one time slot.

Further, the assignment information indicative of a result of the assignment and pattern information are always assigned to TS1 that is the first time slot on which pattern 8 is set. The assignment information and pattern information need to be received by all mobile station apparatuses in the cell, more important information than user data, and therefore, requires use of the pilot pattern such that sufficient pilot symbols are configured both in the frequency domain and time domain. By receiving TS1, each mobile station apparatus is capable of knowing (in which time slot and in which pilot pattern) data for the mobile station apparatus is transmitted.

According to one of pilot patterns 1 to 8 set on each time slot, multiplexing section 190 multiplexes transmission data and pilot symbols. Further, when transmission data to a plurality of mobile station apparatuses is assigned to one time slot, multiplexing section 190 multiplexes a plurality of items of transmission data. Transmission data is multiplexed, for example, using the direct spreading scheme, frequency hopping scheme and the like. Accordingly, on TS3 is multiplexed transmission data 1 for mobile station apparatus 1, transmission data 2 for mobile station apparatus 2 and pilot symbols according to pattern 6. Likewise, on TS4 is multiplexed transmission data 3 for mobile station apparatus 3, transmission data 4 for mobile station apparatus 4 and pilot symbols according to pattern 5, and on TS6 is multiplexed transmission data 5 for mobile station apparatus 5 and pilot symbols according to pattern 3.

Thus, in this Embodiment, in transmission of pilot symbols on the downlink channel, different pilot patterns are set per time slot, and, in according with pilot patterns selected according to the propagation environment of each mobile station apparatus, transmission data is assigned to each time slot. In this way, pilot symbols in the common pilot pattern can be transmitted to a plurality of mobile station apparatuses in the same propagation environment state, and it is thus possible to improve the transmission efficiency on the downlink channel.

In addition, as well as mobile station apparatuses and base station apparatuses, the invention is applicable to all radio communication apparatuses used in radio communication systems where pilot symbols are used to estimate the propagation environment and the like.

Each of functional blocks used in the descriptions of each of above-mentioned Embodiments is implemented typically as an LSI which is an integrated circuit. These blocks may be configured in one-chip form, or one chip may include part or all of the blocks.

Herein, the LSI is assumed, but the circuit may be referred to as an IC, system LSI, super LSI, ultra LSI and so forth, depending on the degree of integration.

Further, the method of integrating circuits is not limited to the LSI, and may be achieved by a dedicated circuit or general processor. It may be possible to use FPGA (Field Programmable Gate Array) enabling programming after manufacturing the LSI, a reconfigurable processor enabling reconfiguration of connection or setting in the circuit cell inside the LSI, or the like.

Furthermore, if technique appears for integrating circuits substituting for the LSI with progress in semiconductor technique or another derived technique, the functional blocks will naturally be integrated using such technique. Adaptation and the like of biotechnology may have the potential.

A first aspect of a radio communication apparatus of the invention adopts a configuration having: an acquirer that acquires a parameter comprising an indicator of a propagation environment in which pilot symbols are transmitted; a pilot pattern selector that selects a pilot pattern indicating positions of the pilot symbols in a frequency domain and a time domain according to the parameter acquired; and a transmitter that transmits a signal including information of the pilot pattern selected.

According to this configuration, since the pilot pattern in the frequency domain and the time domain is selected according to the parameter as an indicator of the propagation environment and information of the pilot pattern is transmitted, it is only required to notify a communicating party of which pilot pattern is selected as feedback, and it is thus possible to prevent increases in information amount of the feedback information. Concurrently, the communicating party is capable of transmitting an optimal pilot symbol corresponding to the propagation environment, and it is possible to keep the influence of the feedback information on the channel capacity to a minimum without reducing the transmission efficiency of information by transmission of pilot symbol.

A second aspect of the radio communication apparatus of the invention adopts a configuration in which the acquirer has an interference amount measurer that measures an amount of interference caused by signals transmitted from a radio communication apparatus other than a communicating party or by multipath signals; and the pilot pattern selector selects a pilot pattern whereby a proportion of the pilot symbols is greater when the amount of interference increases.

According to this configuration, since a pilot pattern is selected such that the proportion of pilot symbols is larger in a frame when the amount of interference increases, it is possible to prevent deterioration in reception quality due to interference from other radio communication apparatuses and multipath interference, improve accuracy in channel estimation, and properly demodulate data symbols.

A third aspect of the radio communication apparatus of the invention adopts a configuration in which the interference amount measurer measures the amount of interference using the pilot symbols contained in a received signal.

According to this configuration, since the interference amount is measured using the pilot symbols contained in the received signal, it is possible to measure the interference amount accurately by comparing with a known pilot symbol.

A fourth aspect of the radio communication apparatus of the invention adopts a configuration in which the acquirer has a delay dispersion measurer that measures delay dispersion indicated by delayed waves of a received signal; and the pilot pattern selector selects a pilot pattern whereby the pilot symbols are densely arranged in the frequency domain when the delay dispersion increases.

According to this configuration, since a pilot pattern is selected such that the pilot symbols are densely arranged in the frequency domain when the delay dispersion increases, even when the delay dispersion is large and the variation is intense in frequency selective fading, it is possible to improve the accuracy in channel estimation and properly demodulate data symbols multiplexed on subcarriers with different frequencies, for example.

A fifth aspect of the radio communication apparatus of the invention adopts a configuration in which the delay dispersion measurer generates a delay profile of the received signal and measures the delay dispersion.

According to this configuration, since the delay profile of the received signal is generated and the delay dispersion is measured, it is possible to measure accurate delay dispersion every time a signal is received.

A sixth aspect of the radio communication apparatus of the invention adopts a configuration where the delay dispersion measurer stores in advance the delay dispersion corresponding to the shape of the cell where the apparatus belongs.

According to this configuration, since the delay dispersion corresponding to the shape of the cell where the apparatus belongs is stored in advance, it is possible to reduce the amount of calculation to measure the delay dispersion and increase the speed of the processing.

A seventh aspect of the radio communication apparatus of the invention adopts a configuration in which the acquirer has a moving speed estimator that estimates moving speed of the apparatus or a communicating party, and the pilot pattern selector selects a pilot pattern that the pilot symbols are densely arranged in the time domain as the moving speed increases.

According to this configuration, since a pilot pattern is selected such that the pilot symbol is densely configured in the time domain as the moving speed is higher, even when the moving speed is high and the temporal fading variation is intense, it is possible to improve the accuracy of channel estimation and properly demodulate data symbols.

An eighth aspect of the radio communication apparatus of the invention adopts a configuration in which the moving speed estimator estimates the moving speed based on a variation in reception power of the pilot symbols contained in the received signal.

According to this configuration, since the moving speed is estimated based on the variation in reception power of the pilot symbols contained in the received signal, it is possible to estimate the moving speed accurately with simple calculation.

A ninth aspect of the radio communication apparatus of the invention adopts a configuration in which a modulation scheme selector is further provided that selects a modulation scheme selector that selects a modulation scheme of data transmitted from a communicating party, wherein the pilot pattern selector selects the pilot pattern corresponding to the parameter and a modulation level of the modulation scheme selected in the modulation scheme selector.

A tenth aspect of the radio communication apparatus of the invention adopts a configuration in which the pilot pattern selector selects a pilot pattern whereby the pilot symbols are densely arranged in the time domain or in the frequency domain as the modulation level of the modulation scheme selected in the modulation scheme selector increases.

An eleventh aspect of the radio communication apparatus of the invention adopts a configuration in which an adder is further provided that adds to the parameter an offset with a value that varies with the modulation level of the modulation scheme selected in the modulation scheme selector, wherein the pilot pattern selector selects the pilot pattern according to the parameter with the offset added thereto.

A twelfth aspect of the radio communication apparatus of the invention adopts a configuration in which the pilot pattern selector selects a pilot pattern obtained by further inserting a number of pilot symbols in accordance with the modulation level of the modulation scheme selected in the modulation scheme selector to the pilot pattern selected according to the parameter.

According to these configurations, since the proportion of pilot symbols varies with the modulation scheme, it is possible to select a pilot pattern to transmit optimal, necessary and sufficient pilot symbols according to the modulation scheme.

A thirteenth aspect of the radio communication apparatus of the invention adopts a configuration in which: the transmitter transmits a signal containing pilot symbols arranged according to a pilot pattern set per time slot; and the pilot pattern selector selects a pilot pattern for each of a plurality of communicating parties.

A fourteenth aspect of the radio communication apparatus of the invention adopts a configuration in which an assigner is further provided that assigns a time slot to each of the plurality of communicating parties based on the pilot pattern selected in the pilot pattern selector.

According to these configurations, since a common pilot pattern of the pilot symbol can be transmitted to a plurality of communicating parties in the same propagation environment state, it is possible to improve transmission efficiency on the downlink channel.

A first aspect of a pilot symbol transmission method of the invention has the steps of acquiring a parameter comprising an indicator of a propagation environment in which pilot symbols are transmitted; selecting a pilot pattern indicating positions of the pilot symbols in a frequency domain and a time domain according to the parameter acquired; and transmitting a signal including information of the pilot pattern selected.

According to this method, since the pilot pattern in the frequency domain and the time domain is selected according to the parameter as an indicator of the propagation environment and information of the pilot pattern is transmitted, it is only required to notify a communicating party of which pilot pattern is selected as feedback, and it is thus possible to prevent increases in information amount of the feedback information. Concurrently, the communicating party is capable of transmitting optimal pilot symbols corresponding to the propagation environment, and it is possible to keep the influence of the feedback information on the channel capacity to a minimum without reducing the transmission efficiency of information by transmission of pilot symbol.

This application is based on the Japanese Patent Applications No. 2003-292667 filed on Aug. 12, 2003, and No. 2004-162388 filed on May 31, 2004, entire contents of which are expressly incorporated by reference herein.

INDUSTRIAL APPLICABILITY

The radio communication apparatus and pilot symbol transmission method according to the invention enable the influence of the feedback information on the channel capacity to be kept to the minimum without reducing the transmission efficiency of information by transmission of pilot symbol, and are useful as a radio communication apparatus and pilot symbol transmission method used in a radio communication system in which an individual pilot symbol is transmitted for each user.

The invention claimed is:

1. A receiving apparatus that receives a pilot signal from a base station, the receiving apparatus comprising:
 a receiver configured to receive a signal including pattern information indicating which pilot pattern among at least two pilot patterns is respectively assigned to each time slot of a plurality of time slots, each of the pilot patterns representing different densities of pilot signals arranged in mutually different patterns in at least one of the frequency domain and the time domain, the different densities of pilot signals corresponding to different proportions of pilot symbols, at least two of the time slots being assigned different pilot patterns from among the at least two pilot patterns; and
 an extractor configured to extract the pilot signal according to the pattern information indicating which pilot pattern among the at least two pilot patterns is respectively assigned to each time slot of the plurality of time slots.

2. The receiving apparatus according to claim 1, wherein the pilot pattern assigned to each time slot is selected based on at least one of parameters concerning interference by multipath, parameters reflecting a propagation environment, and parameters reflecting a delay dispersion.

3. The receiving apparatus according to claim 1, wherein:
 the receiver is configured to receive a multiplexed signal in which the pilot signal is multiplexed with user data; and
 the extractor is configured to extract the pilot signal from the multiplexed signal.

4. A mobile station comprising the receiving apparatus according to claim 1.

5. A method performed in a radio communication apparatus of receiving a pilot signal from a base station, the method comprising:
 receiving a signal including pattern information indicating which pilot pattern among at least two pilot patterns is respectively assigned to each time slot of a plurality of time slots, each of the pilot patterns representing different densities of pilot signals arranged in mutually different patterns in at least one of the frequency domain and the time domain, the different densities of pilot signals corresponding to different proportions of pilot symbols, at least two of the time slots being assigned different pilot patterns from among the at least two pilot patterns; and
 extracting the pilot signal according to the pattern information indicating which pilot pattern among the at least two pilot pattern is respectively assigned to each time slot of the plurality of time slots.

6. The method according to claim 5, wherein the pilot pattern assigned to each time slot is selected based on at least one of parameters concerning interference by multipath, parameters reflecting a propagation environment, and parameters reflecting a delay dispersion.

7. The method according to claim 5, wherein:
 the receiving step includes receiving a multiplexed signal in which the pilot signal is multiplexed with user data; and
 the extracting step includes extracting the pilot signal from the multiplexed signal.

8. An integrated circuit that controls reception of a pilot signal from a base station in a receiving apparatus, the integrated circuit comprising:
 one or more input nodes, which, in operation receive a signal including pattern information indicating which pilot pattern among at least two pilot patterns is respectively assigned to each time slot of a plurality of time slots, each of the pilot patterns representing different densities of pilot signals arranged in mutually different patterns in at least one of the frequency domain and the time domain, the different densities of pilot signals corresponding to different proportions of pilot symbols, at least two of the time slots being assigned different pilot patterns from among the at least two pilot patterns; and
 reception control circuitry, which, in operation, extracts the pilot signal according to the pattern information indicating which pilot pattern among the at least two pilot patterns is respectively assigned to each time slot of the plurality of time slots.

9. The integrated circuit according to claim 8, wherein the pilot pattern assigned to each time slot is selected based on at least one of parameters concerning interference by multipath, parameters reflecting a propagation environment, and parameters reflecting a delay dispersion.

10. The integrated circuit according to claim 8, wherein:
 the one or more input nodes in operation receive a multiplexed signal in which the pilot signal is multiplexed with user data; and
 the reception control circuitry in operation extracts the pilot signal from the multiplexed signal.

* * * * *